US011256085B2

(12) United States Patent
Breese

(10) Patent No.: US 11,256,085 B2
(45) Date of Patent: Feb. 22, 2022

(54) LIGHT DEFLECTION PRISM FOR MOUNTING TO A SURFACE OF A DEVICE, DEVICE, AND METHOD FOR ALTERING A FIELD OF VIEW OF A CAMERA

(71) Applicant: NATIONAL UNIVERSITY OF SINGAPORE, Singapore (SG)

(72) Inventor: Mark Brian Howell Breese, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 0 days.

(21) Appl. No.: 16/635,594

(22) PCT Filed: Aug. 1, 2018

(86) PCT No.: PCT/SG2018/050389
§ 371 (c)(1),
(2) Date: Jan. 31, 2020

(87) PCT Pub. No.: WO2019/027369
PCT Pub. Date: Feb. 7, 2019

(65) Prior Publication Data
US 2020/0241290 A1   Jul. 30, 2020

(30) Foreign Application Priority Data

Aug. 1, 2017  (SG) ............................ 10201706276V
Oct. 19, 2017 (SG) ............................ 10201708586V

(51) Int. Cl.
*G02B 27/00*   (2006.01)
*H04N 5/225*   (2006.01)
(Continued)

(52) U.S. Cl.
CPC ............ *G02B 27/0081* (2013.01); *G02B 5/04* (2013.01); *G03B 17/17* (2013.01); *G06T 5/50* (2013.01);
(Continued)

(58) Field of Classification Search
CPC ...... G02B 5/04; G02B 27/0081; G03B 17/17; H04N 5/247; H04N 5/23238; B60R 11/04
See application file for complete search history.

(56) References Cited

U.S. PATENT DOCUMENTS 6,166,764 A     12/2000 Sakata
2008/0025571 A1*  1/2008 Nakao ................. H04N 5/3415
                                                        382/107
(Continued)

FOREIGN PATENT DOCUMENTS

CN      105704355 A      6/2016
KR   10-2014-0005658 A   1/2014
RU       2625164 C1      7/2017

OTHER PUBLICATIONS https://en.wikipedia.org/wiki/Fisheye_lens. <last edited Feb. 20, 2020>.
(Continued)

*Primary Examiner* — Tsion B Owens
(74) *Attorney, Agent, or Firm* — Volpe Koenig

(57) ABSTRACT

Light deflection prism for altering a field of view of a camera of a device comprising a surface with a camera aperture region defining an actual light entrance angular cone projecting from the surface. A method comprises disposing a first surface of a light deflection prism on the surface so as to overlap the angular cone; internally reflecting a central ray, entering the prism under a normal incidence angle through a second surface, at a third surface of the prism towards the first surface under a normal angle of incidence such that the central ray enters the prism at an angle of less
(Continued)

than 90° relative to a normal of the device surface and such that a ray at one boundary of an effective light entrance angular cone defined as a result of the light reflection at the third surface is substantially parallel to the device surface.

12 Claims, 16 Drawing Sheets

(51) Int. Cl.
    *G02B 5/04*     (2006.01)
    *G03B 17/17*     (2021.01)
    *G06T 5/50*     (2006.01)
    *H04N 5/232*     (2006.01)
    *H04N 5/247*     (2006.01)
    *B60R 11/04*     (2006.01)

(52) U.S. Cl.
    CPC ....... *H04N 5/2254* (2013.01); *H04N 5/23238* (2013.01); *H04N 5/247* (2013.01); *B60R 11/04* (2013.01); *B60R 2300/105* (2013.01); *B60R 2300/303* (2013.01); *B60R 2300/802* (2013.01); *G06T 2207/20221* (2013.01)

(56) References Cited

U.S. PATENT DOCUMENTS

2009/0212202 A1* 8/2009 Takahashi ............ H04N 5/2259
    250/227.2
2011/0069507 A1* 3/2011 Haugan ................ G02B 6/0096
    362/551

OTHER PUBLICATIONS https://media.ford.com/content/fordmedia/feu/en/news/2015/06/23/cars-that-can-see-around-corners-ford-in-europe-launches-video-.html.
https://media.ford.com/content/dam/fordmedia/Europe/en/2015/06/smart_front_split-view_camera-III_EU.pdf.
Ford S-Max 180 Camera, Apr. 28, 2015, and associated video. https://www.youtube.com/watch?v=7uuQmNcnHCY.
2015 Ford Edge Titanium 180 camera and park assist—Shawn Piatek, Laurel Ford, Jun. 17, 2015 and associated video. https://www.youtube.com/watch?v=FZ9U-J6IBWU.
https://theta360.com/en/about/theta/v.html. Apr. 1, 2020.
https://ozo.nokia.com/vr/. Apr. 1, 2020.
International Search Report issued in corresponding International Patent Application No. PCT/SG2018/050389 dated Sep. 19, 2018, consisting of 3 pp.

* cited by examiner (a)  (b)

(a) 70 degree deflection of central ray  (b) Extended prism length, S4 > (S1,S2,S3)

(a)

(b)

DRAWBACKS: bulky, has parallax errors, expensive manufacturing of composite device (a) Camera located away from edge of device
→ Cannot see over the edge, limited to viewing parallel to surface (b) Camera located close to edge of device
→ Can see over the edge (to a limited extent)

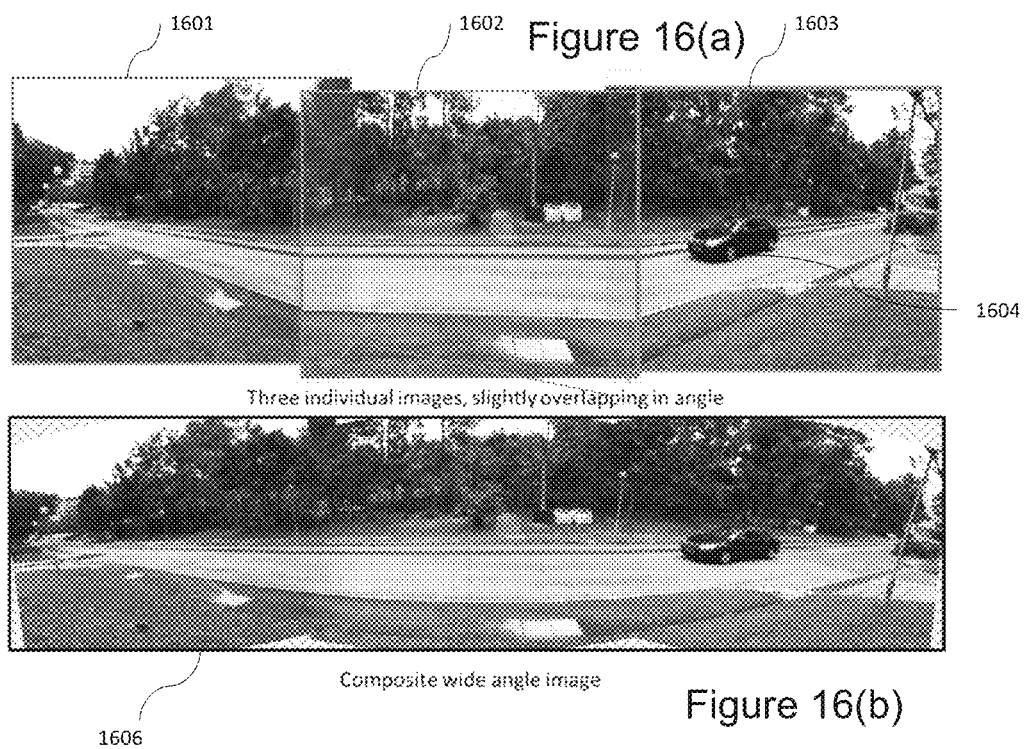
Figure 16(a)
Three individual images, slightly overlapping in angle
Composite wide angle image
Figure 16(b)
Rear view provided by standard FOV camera
See: http://rearviewcamerareviews.com/
Figure 17(a)

LIGHT DEFLECTION PRISM FOR MOUNTING TO A SURFACE OF A DEVICE, DEVICE, AND METHOD FOR ALTERING A FIELD OF VIEW OF A CAMERA

FIELD OF INVENTION

The present invention relates broadly to a light deflection prism for mounting to a surface of a device, to a device, and to a method for altering a field of view of a camera.

BACKGROUND

Any mention and/or discussion of prior art throughout the specification should not be considered, in any way, as an admission that this prior art is well known or forms part of common general knowledge in the field.

Consumer devices with integrated cameras, in particular smartphones are ubiquitous, with over two billion people now owning one. Apart from being mobile telephones they incorporate a range of functions and integrated devices such as high quality cameras which are able to offer a range of photographic and video modes. The market for stand-alone traditional digital (DSLR) cameras has correspondingly plummeted due to huge improvements in the front-mounted and rear-mounted cameras which are now integrated on to every smartphone.

Smartphones may be used for any form of covert recording, specifically parents wanting to record their children without them being aware of it and so altering their behavior. On the other hand, car side-viewing devices, providing a wide-angle field of view to the driver and so eliminating blind spots are also desirable. Also, recording with the smartphone for users with medical conditions which makes it hard for them to hold a conventional smartphone and record with it is desirable.

There are existing products on the market which can be attached to smartphones to allow sideways viewing and recording. What these products typically have in common is that they are designed to bend a central ray of light through 90°. They are specifically designed to work on the rear-mounted smartphone camera which uses larger lenses and apertures in order to transmit as much light as possible into the camera. As a result, the deflection optics require large diameter components, encompassing a large reflective surface (typically a mirror) and may also incorporate additional large optical components such as lenses. The result is that these products are bulky, unwieldy and very obvious. These factors make the products unattractive.

It is standard practice for camera manufacturers to quote the FOV (Field of View) in terms of the maximum possible viewing angular range across the display, which is in the diagonal direction. This is significantly larger than the angular range in either of the horizontal or vertical directions. Thus if in the horizontal direction the angular range is $\Theta_x=65°$ and in the vertical direction the angular range is $\Theta_y=45°$ then the total quoted field of view is FOV 80°. For a camera claiming a FOV of 170° then it is likely that the angular range in the horizontal direction is only around 130°, significantly smaller than the stated FOV and certainly far from a complete field of view in the horizontal direction of $\Theta_x=180°$. Another drawback of any large quoted FOV in a conventional camera is that the image will be highly distorted.

Wide angle and fisheye lenses create a wide, panoramic or hemispherical image in which the viewing angle is typically between 80° and 180°. Their main drawback is that they introduce strong visual distortion, giving images a characteristic convex, non-rectilinear appearance. This has limited their widespread use for very wide-angle viewing. Image correction is possible to some extent where the viewing angle is not too large. For large viewing angles approaching 180° then image correction is limited in having to utilize a highly distorted, compressed angular regions at the outer edge of the fisheye lens view, leading to poor reconstruction of the angular regions. Reference is made e.g. to https://en.wikipedia.org/wiki/Fisheye_lens There are many rear-viewing products for cars available which provide some degree of visibility at the rear of the car, where drivers typically are not able to see much using the rear and side view mirrors. Many cars now have rear-viewing cameras fitted as standard by the manufacturer, many others can be retrofitted by the vehicle owner. Standard models quote a typical FOV of 70 to 100°, whilst certain models claim to have a FOV of 170°. This value should be considered carefully as described above.

Ford (https://media.ford.com/content/fordmedia/feu/en/news/2015/06/23/cars-that-can-see-around-corners--ford-in-europe-launches-video-.html; https://media.ford.com/content/dam/fordmedia/Europe/en/2015/06/smart front split-view_camera-III_EU.pdf; https://www.youtube.com/watch?v=7uuQmNcnHCY; https://www.youtube.com/watch?v=FZ9U-J6lBWU) recently introduced a split-view camera comprising a standard, forward-viewing field of view in the centre and an outer angular field of view on each side of the central image. The composite display exhibits information from a total wide angle in the horizontal direction which is claimed to be 180°, thus allowing roads and traffic over a very large angular cone to be viewed.

The wide angle field of view is provided by the outer angular regions which give a limited and distorted view assumed to be provided by a wide angle or fisheye lens, see FIG. 16. Such strong distortions are an inevitable consequence of remapping images collected by a fisheye lens. This renders the outer angular regions displayed in a manner which is not easy to immediately interpret and of low resolution, which is likely to be unpopular with drivers.

Furthermore, while the composite viewing angle in the horizontal direction is certainly very large, it is questionable whether it actually extends to 180°, which is difficult to discern from the information available. It is believed to be unlikely that the viewing angle can be extended beyond the present limits. Also, it is questionable whether the similarly large angular range in the perpendicular direction provides any useful information. The camera operates with a 1 Mega-pixel camera, so the image quality may be considered quite low. Also, Virtual Reality (VR) is a rapidly growing field and involves the use of 360° panoramic views which are generated by combining the output from multiple cameras which point in different directions. These different angular views are then stitched together to form a large composite image which can be rotated, zoomed etc. These are typically generated by VR camera systems which comprise multiple cameras pointing in different directions. Examples at the upper and lower end of the market include: Basic models, Ricoh Theta S (cost of 350 USD), see: https://theta360.com/en/about/theta/v.hmtl: Top of the range model, Nokia Ozo (cost of 60,000 USD), see: https://ozo.nokia.com/vr/. In both cases the wide angular view, up to of 360°, is generated by combining the output from multiple cameras pointing in different directions. For the basic models there are only two cameras with wide angle lenses used, providing limited resolution.

Embodiments of the present invention seek to address at least one of the above problems.

SUMMARY

In accordance with a first aspect of the present invention, there is provided a light deflection prism for mounting to a surface of a device, the surface comprising a camera aperture region defining an actual light entrance angular cone projecting from the surface of the device, the light deflection prism comprising:

- a first surface for disposing on the surface of the device so as to overlap the actual light entrance angular cone, which may also be referred to as the surface through which light exits the prism;
- a second surface, which may also be referred to as the surface through which light enters the prism; and
- a third surface for internal reflection of a central ray, entering the prism under a normal incidence angle through the second surface, towards the first surface under a normal angle of incidence;
- wherein the prism is configured such that the central ray enters the prism at an angle of less than 90° relative to a normal of the surface of the device and such that a ray at one boundary of an effective light entrance angular cone defined as a result of the light reflection at the third surface is substantially parallel to the surface of the device.

In accordance with a second aspect of the present invention, there is provided a device comprising:

- a surface comprising a camera aperture region of a first camera defining an actual light entrance angular cone projecting from the surface of the device; and
- a first light deflection prism as defined in the first aspect, attached to the surface of the device.

In accordance with a third aspect of the present invention, there is provided a method of altering a field of view of a camera of a device comprising a surface with a camera aperture region defining an actual light entrance angular cone projecting from the surface of the device, the method comprising:

- disposing a first surface of a light deflection prism on the surface of the device so as to overlap the actual light entrance angular cone, which may also be referred to as the surface through which light exits the prism;
- internally reflecting a central ray, entering the prism under a normal incidence angle through a second surface thereof, which may also be referred to as the surface through which light enters the prism, at a third surface of the prism towards the first surface under a normal angle of incidence such that the central ray enters the prism at an angle of less than 90° relative to a normal of the surface of the device and such that a ray at one boundary of an effective light entrance angular cone defined as a result of the light reflection at the third surface is substantially parallel to the surface of the device.

BRIEF DESCRIPTION OF THE DRAWINGS

FIG. 1 (b) is a schematic drawing illustrating front- and rear-mounted cameras on a smartphone.

FIG. 1 (c) is a schematic drawing illustrating normal operation of a front-mounted camera on a smartphone.

FIG. 2 (b) is a schematic drawing illustrating use of large optical components located close to a back surface for deflection of a field of view of a rear-mounted camera on a smart phone.

FIG. 4 (b) is a schematic drawing illustrating use of a deflection of field of view through an angle smaller than 90° using a deflection prism, according to an example embodiment.

FIG. 5 (b) is an enlarged view of a portion of FIG. 5(a).

FIG. 6 (b) is a schematic drawing illustrating a prism geometry in which a length is made greater than the other dimensions, according to an example embodiment.

FIG. 8 (b) is a schematic drawing illustrating an operation mode of a mounted deflection prism for an example viewing angle and orientation, according to an example embodiment.

FIG. 8 (c) is a schematic drawing illustrating an operation mode of a mounted deflection prism for an example viewing angle and orientation, according to an example embodiment.

FIG. 8 (d) is a schematic drawing illustrating an operation mode of a mounted deflection prism for an example viewing angle and orientation, according to an example embodiment.

FIG. 9 (b) is a schematic drawing illustrating elimination of blind spots providing real-time viewing of a wide-angle field of view for vehicle drivers, according to an example embodiment.

FIG. 13 (b) is a schematic drawing illustrating the camera located very close (for example only a few millimetres) to the device edge enabling some light from larger viewing angles greater than 90° entering the small prism, according to a preferred example embodiment.

FIG. 15 (b) is a schematic drawing illustrating an increased viewing angle with an angular range of about 190° to 200° where the mounting surface is curved, for example as is the case are most car rear (or front) spoilers, according to an example embodiment.

FIG. 16 (a) shows three images of a road behind a parked car, with the respective conventional cameras located at the car rear surface at the centre of the spoiler of the car.

FIG. 16 (b) shows a composite wide-angle image of a road behind a parked car using image stitching software packages available with smooth boundaries between the stitched fields and no large changes in angle of the road, according to an example embodiment.

FIG. 17 (b) is a schematic drawing with overlaid wide-angle composite image using an existing wide-angle viewing system.

FIG. 18 (b) is a schematic drawing including a wide-angle composite image, where six images were recorded sequentially from the rear of a car and stitched together using stitching software for use in example embodiments, to provide a viewing angle of significantly greater than 180°.

FIG. 23 (b) shows a composite image from an array of images from a smartphone recorded sequentially in two viewing planes (vertical and horizontal) and stitched together according to an example embodiment, with large angular range in both viewing planes.

FIG. 23 (c) shows a composite image from an array of images from a smartphone recorded sequentially in one viewing planes and stitched together according to an example embodiment, with large angular range in one viewing plane.

DETAILED DESCRIPTION

Embodiments of the present invention provide a miniature optical device which allows smartphone cameras (and all other devices incorporating miniature cameras) to view subjects parallel to the camera surface, and more generally, to have a field of view which is tilted by approximately or exactly 50° to 75° away from the surface normal direction. This is achieved in example embodiments using small optical prisms, of approximately or exactly 2 to 5 mm side lengths in non-limiting example embodiments, to deflect incoming light by angles of typically 50° to 75°. For a smartphone camera which accepts an incoming cone of light of half-angle of about 20° to 40°, this allows viewing parallel to the smartphone surface. Embodiments of the present invention can be used on either the smartphone front-mounted and/or rear-mounted cameras. In particular, when used in conjunction with the front-mounted camera which typically incorporates smaller diameter optical components, the total height of the optical deflection system can be about 3 mm in preferred embodiments. This means that it is almost undetectable and it can be left in place substantially without interfering with other functions.

Embodiments of the present invention can provide a superior device compared to currently available devices and advantageously open up applications beyond smartphones, in fields including laptops, security cameras, spy cameras, drone cameras, or more generally where viewing, for example, perpendicular to the camera lens is wanted.

Embodiments of the present invention can have the following advantageous characteristics or features:

Embodiments of the present invention preferably make use of a deflection of a central ray through an angle of significantly less than 90°, typically approximately or exactly 60°. Where the cone of light entering a smartphone camera lens is up to 30° to either side of the central ray, a deflection of 60° of the central ray means that the maximally deflected light ray is close to 90°, i.e. true sideways viewing, parallel to the smartphone surface can be obtained with advantageously no surface reflections of stray light which can degrade the recorded image.

This can greatly simplify the implementation of sideways viewing, as one does not have to raise the reflective surface upwards in order to ensure that light rays deflected through angles of 90° and more are transmitted into the camera and are not chopped off by the camera body. This means that the optical system can advantageously be greatly miniaturized and located close to the smartphone body in example embodiments. The aperture size of the front-mounted camera can be about or exactly 2 mm or less and the equilateral prism height can preferably be similar to this in example embodiments. This size can now be so small that the optical system becomes very hard to detect and does not interfere with other smartphone operations and so can preferably be permanently left in place.

Figure 1:
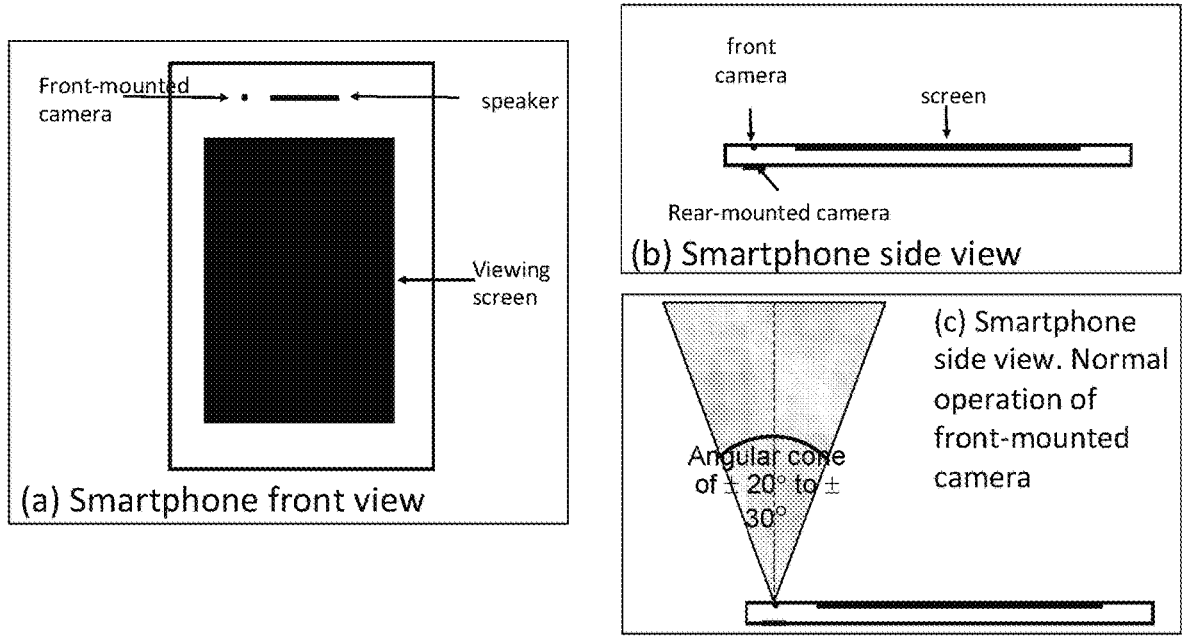
FIG. 1 (a) is a schematic drawing illustrating a front-mounted camera on a smartphone.

The rear-mounted camera on a smartphone records better pictures since it typically incorporates larger diameter optics of several millimeters in order to accept as much light as possible. A front-mounted camera is now also a standard feature (see FIG. 1 (a) to (c)) and is typically associated with recording "selfies" but little else. While the present invention is applicable to both the rear- and front-mounted cameras, example embodiments of the present invention can advantageously provide several useful applications of the front-mounted camera, which typically has small diameter optics of 2 mm or less. Both front- and rear-mounted cameras typically accept light over an angular cone of up to 30° to either side of the central ray to produce a wide field of view, see FIG. 1 (c). The precise angles depend on the model of smartphone, its mode of operation and the camera & display screen axis: along the vertical, long-axis of the display screen a cone of light up to ±30° is typically accepted, while the horizontal short axis of the display screen typically accepts a cone of up to ±20°.

Figure 2:
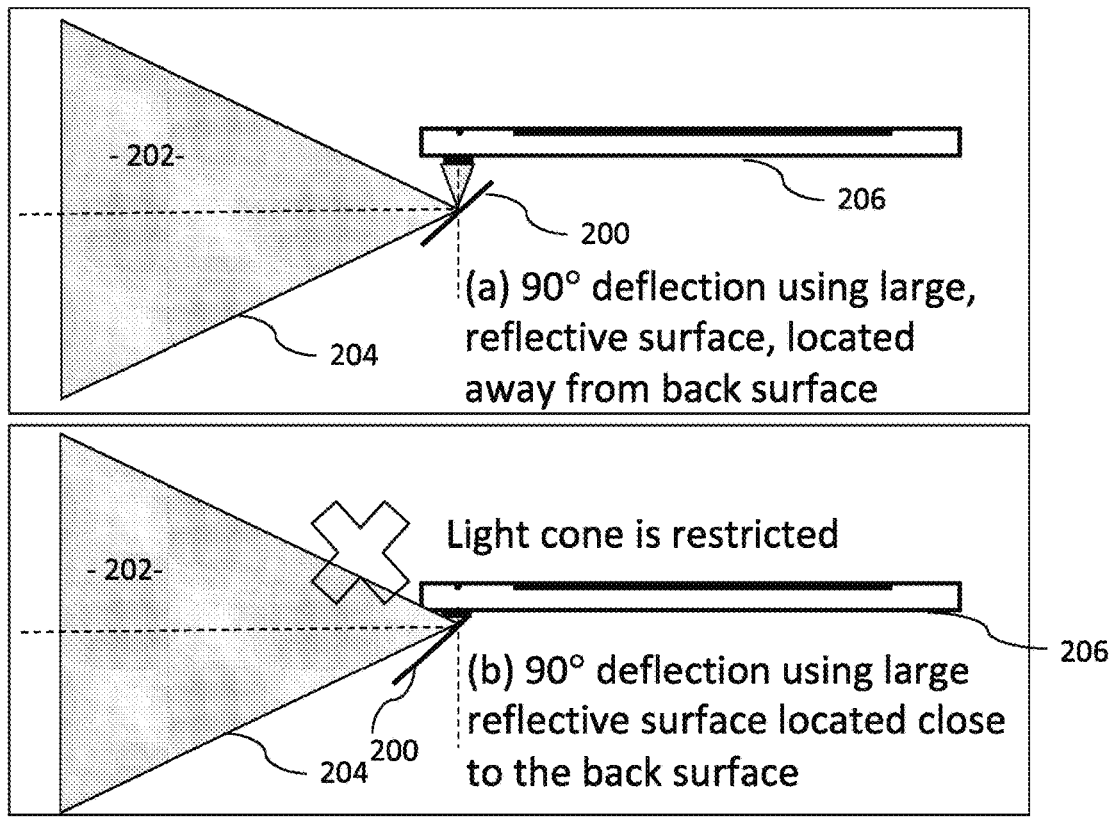
FIG. 2 (a) is a schematic drawing illustrating use of large optical components located away from a back surface for deflection of a field of view of a rear-mounted camera on a smart phone.

There are several products on the market which can be attached to smart phones to allow sideways viewing and recording. What all these products have in common is that they are typically designed to bend a central ray of light through 90°. They are designed to work on the rear-facing smartphone camera, and as a result, they require large optical components, encompassing a large reflective surface 200 (mirror or prism) and may also incorporate additional optical components such as lenses, see FIGS. 2 (a) and (b). A further problem is that the half 202 of the light cone 204 which is deflected more than 90° tends to be blocked by the smartphone body 206, requiring the reflective element 200 to be raised up to prevent this. Furthermore, surface reflections tend to limit the image quality. The result is that these products are bulky, unwieldy, protruding and it is not possible/practical to leave them in place as they are so obtrusive. None of these existing systems can be considered as stealthy or hard to spot. Furthermore, devices such as phones with these existing systems attached cannot be placed flat on its (rear) surface owing to the protruding optics. All these factors make these products unattractive.

Figure 3:
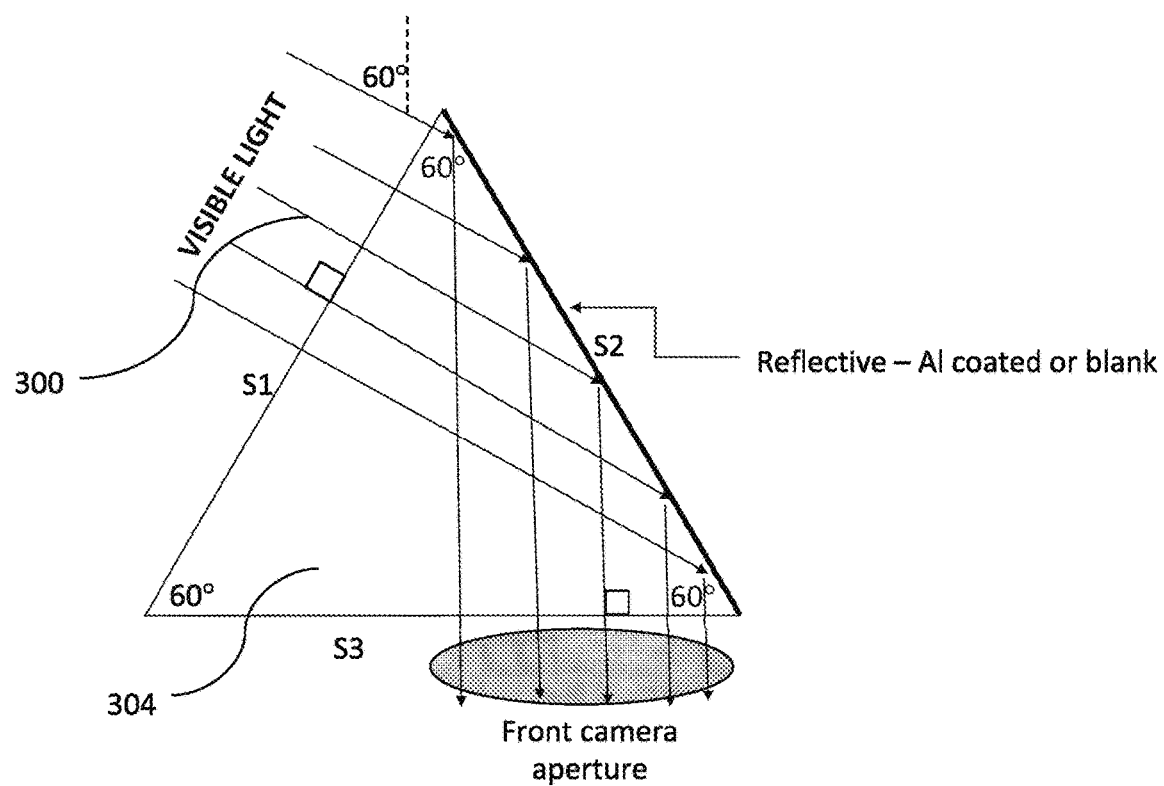
FIG. 3 is a schematic drawing illustrating use of a deflection of a central ray through an angle smaller than 90° using a deflection prism, according to an example embodiment.
Figure 4:
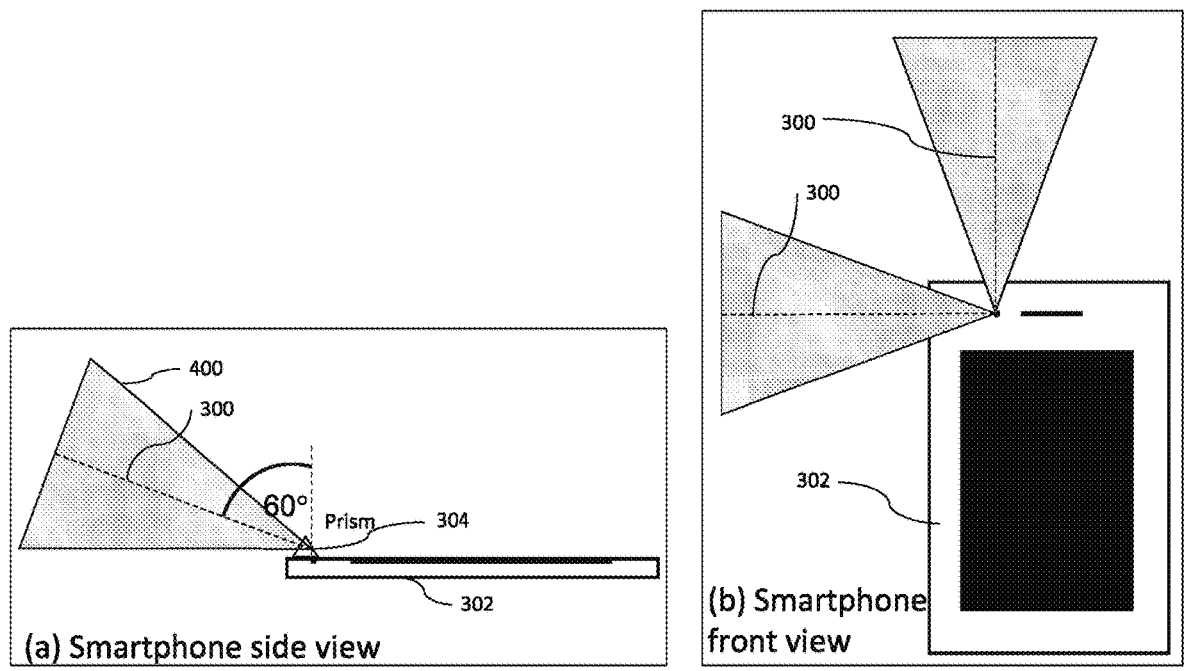
FIG. 4 (a) is a schematic drawing illustrating use of a deflection of field of view through an angle smaller than 90° using a deflection prism, according to an example embodiment.

In contrast, example embodiments of the present invention make use of a deflection of a central ray 300 through an angle smaller than 90°, typically approximately or exactly 60°, noting that this can be tuned either side of this value depending on the type of camera and the application in different embodiments, see FIG. 3 and FIGS. 4 (a) and (b). The prism is preferably attached by way of a prism holder, which may also be referred to as a "customized housing", configured to hold the prism accurately in place, and in preferred embodiments allowing for at least two different rotational orientations of the prism (compare FIGS. 4 (a) and (b)). Advantageously, the prism holder can be provided with a shape and configuration so as to be attractive as an accessory. With reference to FIG. 3, the inventors have recognized that since the cone of light entering a smartphone camera lens is typically up to 30° to either side of the central ray 300, a deflection of 60° of the central ray 300 means that the maximally deflected light ray is now ~90°, i.e. true sideways viewing, parallel to the smartphone 302 surface is possible. Furthermore, the deflection angle can be carefully controlled by varying the prism 304 geometry in various embodiments.

It is noted that while preferred embodiments of the present invention may be designed to work with a smartphone front-mounted camera (the one which is normally only used for 'selfies'), embodiments of the present invention can also work with the rear-mounted camera. Slightly larger prisms or lower light collection efficiency may be implemented in such embodiments so as to minimize size. The aperture size 306 of a typical front-mounted camera is smaller than 2 mm so now the reflective prism 304 height can be comparable to this, advantageously making the reflective prism 304 very hard to detect and not interfering with other smartphone operations, so the prism 304 can be permanently left in place if required.

Example embodiments of the present invention can greatly simplify the concept of sideways viewing as preferably one does not have to separate the reflective optics, i.e. prism 304, away from the smartphone 302 surface. Furthermore, the optical system can be greatly miniaturized and located close to the main body.

Figure 5:
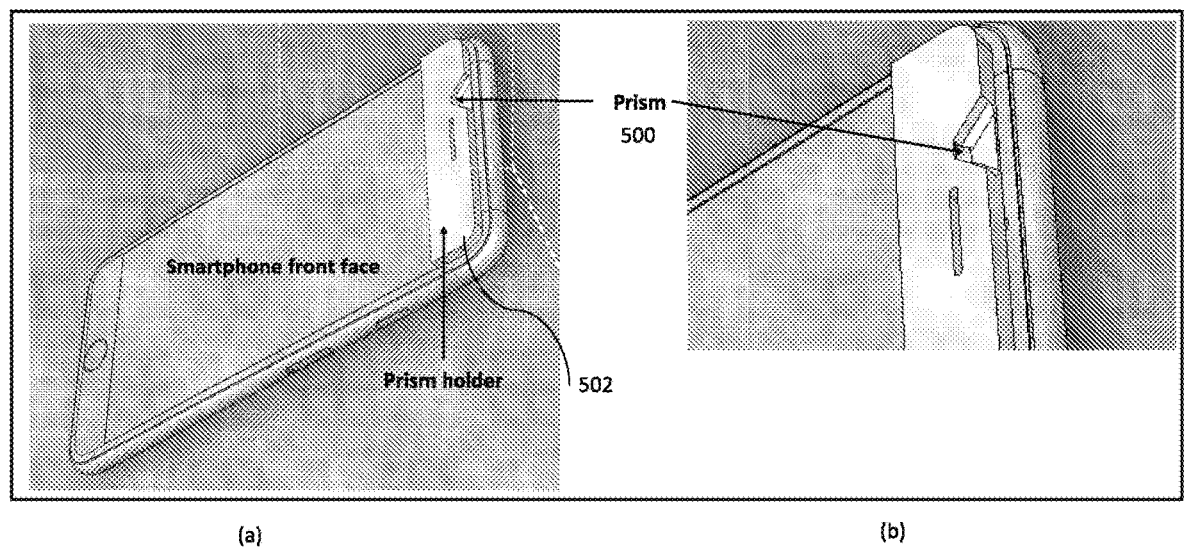
FIG. 5 (a) is a schematic drawing illustrating a miniature equilateral prism mounted in a customized housing attached over a smartphone front-mounted camera, according to an example embodiment.

FIGS. 5 (a) and (b) show renditions of an example embodiment of the present invention. A miniature equilateral prism 500 is mounted in a customized housing 502 which may be, for example, approximately or exactly 3 mm in thickness and attached over the smartphone front-mounted camera (hidden by the prism 500). Since the prism 500 and housing or holder 502 are so thin they substantially do not interfere with other smartphone functions, and can be left in place permanently while being hard to detect. Embodiments of the present invention can be used with all smartphone cameras, i.e. the present invention is not limited just to one model or manufacturer.

Optical Prism Geometry and Operating Mode According to Example Embodiments

Embodiments of the present invention use equilateral prisms (and variations of them, such as isosceles prisms as described below) to deflect light through a typical, but not limiting, angle of 60°. The description of the example embodiments of the present invention mostly considers equilateral prisms, but it is noted that other geometries can be used, as will also be described below.

Equilateral prisms are common optical elements which are widely used in optics experiments in a 'dispersion' mode, whereby white light which is incident on one surface at a shallow angle is split into resolved wavelength after being transmitted through the high refractive index optical material. In contrast, embodiments of the present invention utilize equilateral prisms (and variations of them) in a 'reflective' mode rather than dispersive, see FIG. 3. Light enters through surface S1; surface reflection is minimized by having the entrance face as normal to the incident light as possible, so the central ray 300 ideally is normal to the entrance surface S1. Light is reflected from surface S2 and exits the prism 304 through surface S3, where it enters the smartphone front-facing camera at normal incidence. Surface S2 is preferably coated with a reflective material such as aluminium (though the prism 304 still reflects with lower efficiency if an uncoated face is used in different embodiments). A significant advantage of using a coated surface in a prism as the reflecting surface, rather than a mirror, is that the mirror can be easily fogged and dirtied and is then very hard to clean. In comparison, the reflective prism surface S2 is much more robust, with the reflective surface S2 protected by the underlying prism glass.

Now consider the extent of the light cone 400 entering the prism 304, see FIG. 4 (*a*). Light rays up to 90° to the smart phone 302 front surface can be deflected into the camera lens.

As described above, the equilateral prism can have side lengths (S1=S2=S3 in FIGS. 3 and 4 (*a*) and (*b*)) of only approximately or exactly 2 or 3 mm, so the deflecting optical system is very small. The inventors have recognized, that while there is little other use and demand for millimeter-size equilateral prisms, custom-made prisms for use in example embodiments of the present invention can provide the advantages described herein. The precise relationship between prism height and deflection angle according to example embodiments is considered further below.

Refractive Index & Optical Material According to Example Embodiments

Equilateral prisms operating in a conventional dispersion mode are typically made from high refractive index (n~1.7) material, in order to maximize separation of different wavelengths. In example embodiments of the present invention there is no need for this, so the prisms can be made in lower refractive index glass such as BK7 or soda lime (n~1.5).

Glass is the preferred material for the optical prism according to example embodiments, being scratch-resistant, and because it can be highly polished and it does substantially not degrade over time. However, glass may be a more expensive choice owing to the manufacturing process, so cheaper materials can also be used, such as acrylic or other transparent plastics which have a refractive index similar to that of soda lime or BK7 glass can be used in different embodiments. This makes the optical system significantly cheaper but more care may be needed to minimize damage to the entrance surface in such embodiments.

Other Prism Geometries According to Example Embodiments.

Reflective Isosceles Prism

Figure 6:
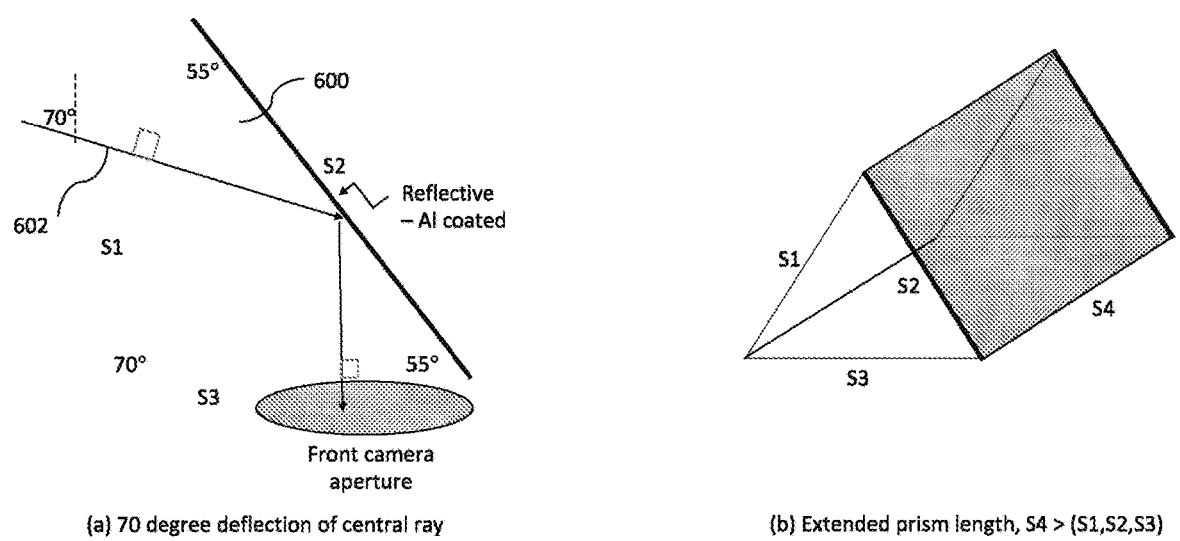
FIG. 6 (a) is a schematic drawing illustrating a customized prism geometry where the central ray is deflected through 70°, according to an example embodiment.

The equilateral prism can be replaced with other, custom-made prism geometries which can produce an optical deflection angle of less than, or greater than 60° (as for an equilateral prism) but less than 90° (as for a right-angle prism), according to different embodiments of the present invention. That is, the deflection angle of a central ray can be carefully controlled and tuned by suitable prism design. FIG. 6 (*a*) shows an example of a customized prism geometry 600 where the central ray 602 is deflected through 70°. It is noted that this is an isosceles prism in which the reflective surface S2 lies between the two equal angles and is longer than the other two surfaces S1 and S3. In FIG. 6 (*a*) this larger deflection of the central ray 602 allows smaller angular light cones of ±20° to have a maximum deflection angle of 90°, or for a larger light cone of ±30° this would allow a maximum deflection angle of slightly greater than 90° to be captured by the camera. Furthermore, it allows the deflection angle and prism height to be carefully matched, as described below.

Relationship Between Prism Height and Light Deflection Angle

The preferred optical device could deflect light through the required angle and have a minimal height, so that it has a low visibility and does not interfere with other phone functions. However, in practice there is a trade-off between height H of the prism and light deflection angle according to example embodiments, and it is desirable to understand this in order to optimally design the prism geometry for particular needs according to different embodiments.

Figure 7A:
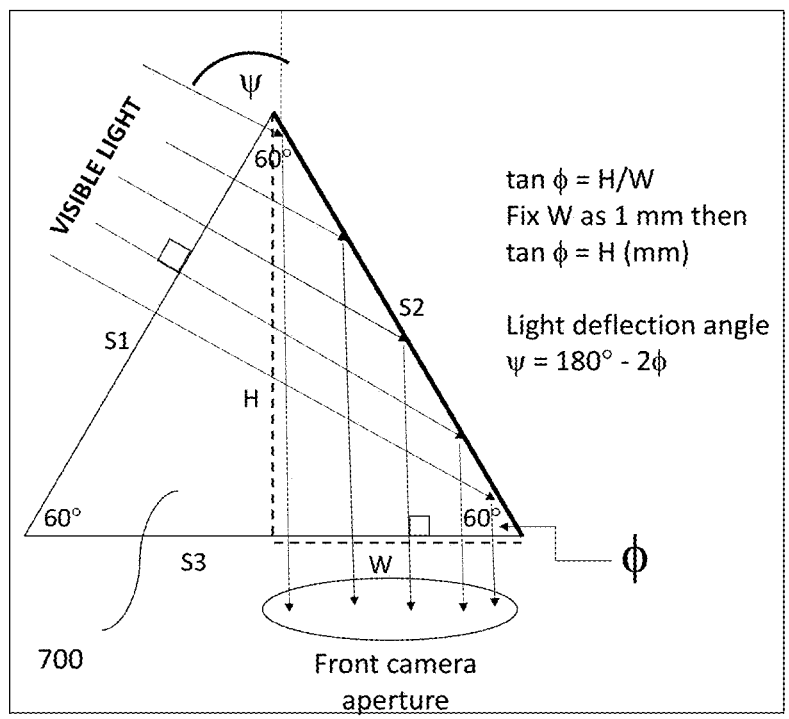
FIG. 7 (a) is a schematic drawing illustrating an equilateral prism and the relationship between the prism angle $\phi$ and the light deflection angle $\psi$, according to an example embodiment FIG. 7 (b) is a graph illustrating the relationship between light deflection angle $\psi$ and prism height H, assuming a 1 mm width of W, i.e light is transmitted into a 1 mm diameter aperture, according to an example embodiment.
Figure 7B:
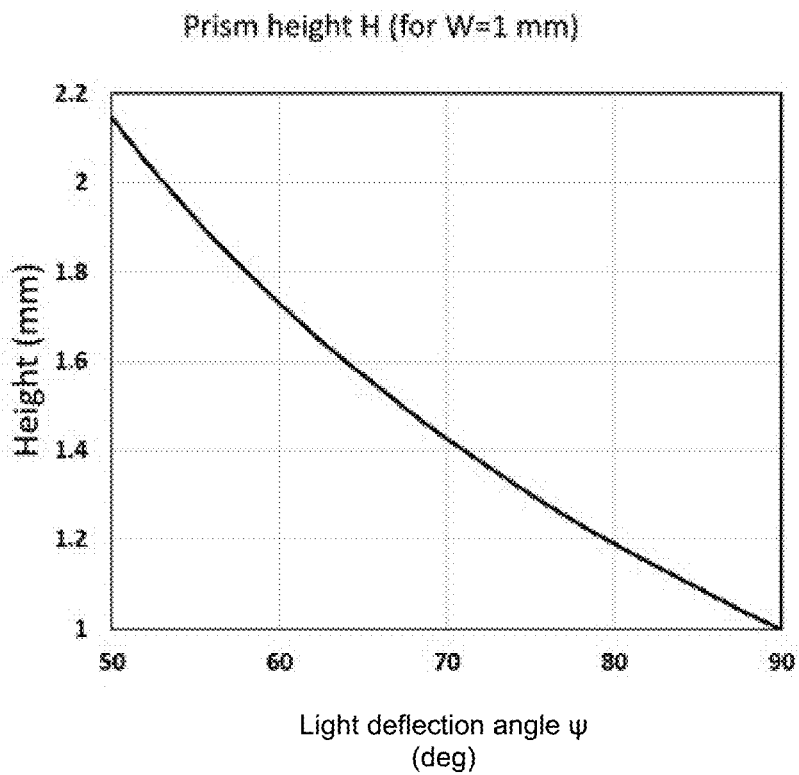

FIG. 7 (*a*) starts with the example of an equilateral prism 700 to show the relationship between the prism angle φ and the light deflection angle ψ. Also important is the relationship between the prism height H for a particular geometry, which determines how thick the device is and so how far the device protrudes from the smartphone surface, and the useable width W of the exit face S3. Not all of the exit face S3 can be used since deflected central rays are not incident on all of this surface. One desires that W is large so that a large fraction of incident light is transmitted to the camera. FIG. 7(*b*) shows the relationship between light deflection angle ψ and prism height H, assuming a 1 mm width of W, i.e light is transmitted into a 1 mm diameter aperture. One sees how to tune the deflection angle ψ and what constrains this; as the deflection angle ψ decreases from 90° (right-angle prism, which has the minimum prism height H) the height H increases significantly so that by a deflection angle of 60° (equilateral prism) the height has increased from 1 to 1.7 mm. One can see the advantage of being able to customize the prism geometry and hence vary the deflection angle to e.g. greater than 60° in order to reduce the prism height and so make the optical device less protruding, while making it significantly less than 90° in order to accept a large cone of light around the central ray, according to various embodiments of the present invention.

Extending Prism Length S4

A conventional equilateral prism has square sides, so that its length S4 is the same as the side lengths S1, S2, S3, e.g. 2 mm. In certain embodiments of the invention there can be advantages to having a prism geometry 604 in which the length S4 is made greater than the other dimensions, e.g. making S4=4 mm or 5 mm while maintaining the other dimensions as S1=S2=S3=2 mm, as illustrated in FIG. 6 (*b*). This can help in three ways: first, additional stability of the prism orientation and handling as the bottom surface is larger. Second, making alignment of the small prism over a small lens easier as it relaxes the alignment tolerance in the direction of S4 while maintaining the same prism height, which depends only on S1, S2, S3. Third, e.g. in the case where the device is attached to the larger, rear camera lens which has a larger aperture, then a prism with a greater length S4 can deflect a wider angular cone into it. Even if the prism height is as small as 2 mm so that the area of exit face S3 is smaller than the lens aperture, noting that this is not ideal as it chops down the light entering the camera, this can be partially offset by increasing S4 to the full extent of the larger camera aperture according to example embodiments.

Operating Modes According to Example Embodiments

Figures 8A, 8B, 8C, 8D:
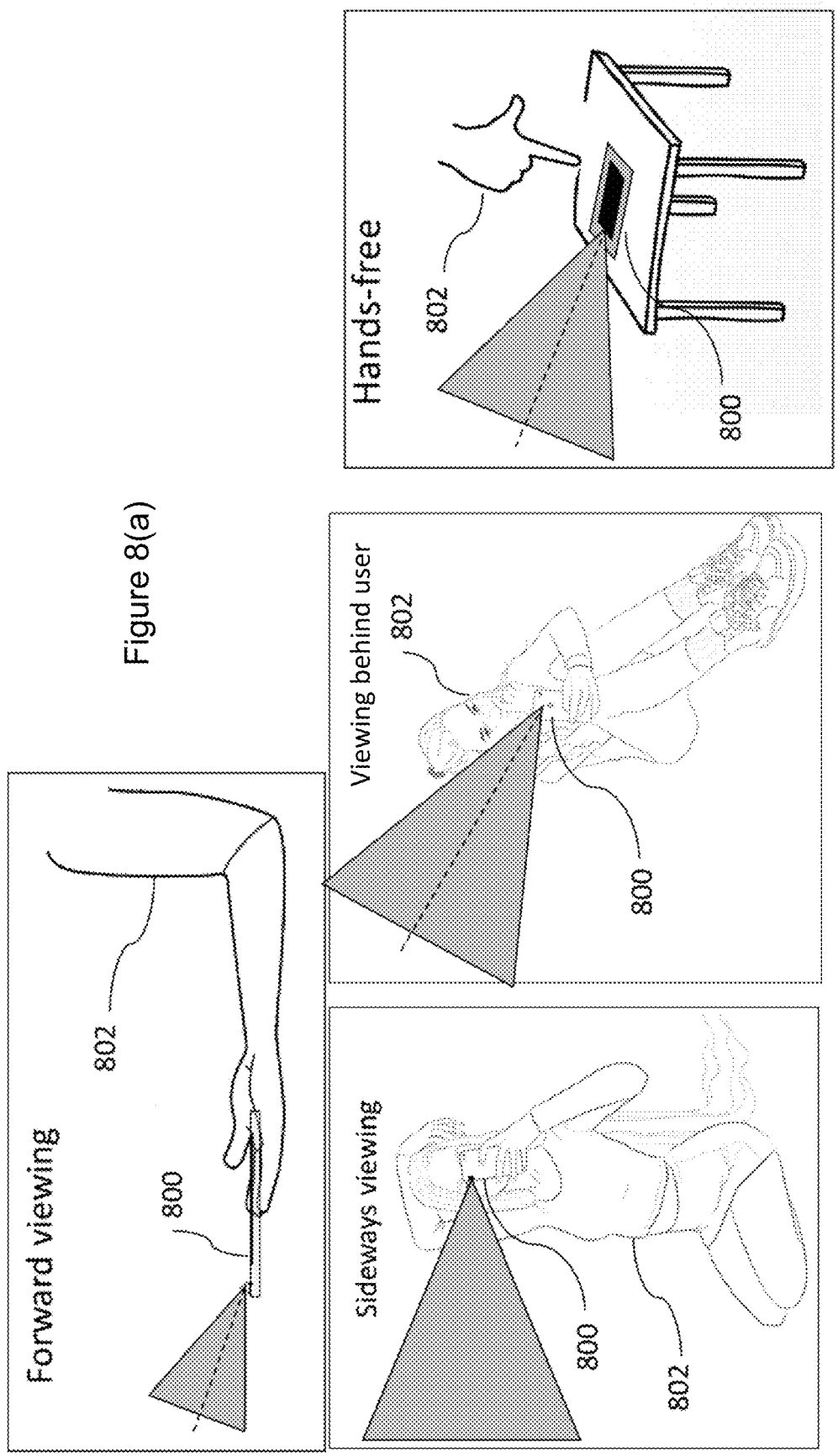
FIG. 8 (a) is a schematic drawing illustrating an operation mode of a mounted deflection prism for an example viewing angle and orientation, according to an example embodiment.

Embodiments of the present invention can offer several modes of operation for viewing objects and/or subjects from different angles and orientations, see FIGS. 8 (*a*) to (*d*).

Forward-viewing. Smartphone 800 held flat, see FIG. 8 (*a*). If smartphone 800 is tilted slightly away from user 802 then the viewing cone can extend further downwards in angle if necessary.

Side-viewing. Smartphone 800 held vertically, normal to user's 800 face, see FIG. 8 (*b*). Records an object or subject (not shown) in a direction up to parallel to the front surface while it looks like the user 802 is holding a screen normally.

Rear-viewing. Smartphone 800 held vertically, tilted to user's 802 face, see FIG. 8 (*c*). Records an object or subject (not shown) behind user 802 (over their shoulder) while it seems the user 800 is viewing the screen which is tilted away from subject. This is the mode closest to the application of different embodiments of the present invention described below on wide-angle viewing for vehicle driver.

Hands-free mode. Suitable for those unable for any reason to hold a smartphone, see FIG. 8 (d). Embodiments of the present invention allow the user 802 to operate the smartphone camera functionality and record by placing it flat on a table and operating with preferably only one finger with no need to hold the smartphone 800.

Image Reflections and Inversions According to Example Embodiments

One needs to bear in mind the relationships between what is observed on the smartphone viewing screen and how that may differ to what is seen on the same screen after a picture has been recorded. This depends on the smartphone orientation and the orientation of the deflecting optics.

In embodiments of the present invention the deflecting optics are based on a single reflection from a reflective surface. It is understood that this leads to image inversion in the plane of deflection whereas the unbent plane appears as normal. There are more complex prisms, such as a pentaprism, which involve reflection from two surfaces with the result that this image in the plane of deflection is upright, i.e. not inverted. However, such prisms are more bulky and may only work with a narrower cone of light than that desired according to preferred embodiments described herein.

First, consider the difference between the rear-mounted camera and the front-mounted camera. Assume that the smartphone is held normally by the long axis and viewed in the same orientation. For a rear-mounted camera, the image is inverted about the horizontal axis so it appears upside down. For a front-mounted camera it appears in its correct orientation, i.e. upright. This is a significant advantage of embodiments implemented for a front-mounted camera in terms of usability and the way in which the smartphone is instinctively oriented by the user. The situation along the shorter, horizontal direction is the opposite; for a rear mounted camera the image appears the correct way round whereas for a front-mounted camera it is reflected about the vertical axis, so for example text appears to be written backwards. This can be re-inverted later with software if desired.

Use of Invention with Rear-Mounted Camera

While the primary application of embodiments of the present invention is the use of very small prism of 2 to 4 mm in height in conjunction with the front-mounted camera, the present invention can also be applied in conjunction with the rear-mounted camera which typically has larger optical apertures.

In one such embodiment, the reflecting prism size can be increased, e.g. to have side lengths of approximately or exactly 4 to 5 mm in order to fully handle the larger optical aperture of this camera. This makes the height of the optical system around 4 to 5 mm, which is still superior to anything currently available.

In another such embodiment, miniature prisms of approximately or exactly 2 to 4 mm in height are used in order to minimize the height of the reflecting optics. This causes a reduction of the light cone that the optics can deflect into the rear-mounted camera. However, this problem disappears when the rear-mounted camera zoom magnification is increased, since this involves a corresponding reduction in the light cone entering the camera and now the small deflection optics are fully compatible with the light cone required to form the image. In this embodiment, having the prism length S4 greater than S1, S2, S3 becomes particularly advantageous, see above section 'Customized prism geometry according to example embodiments'

Figure 9:
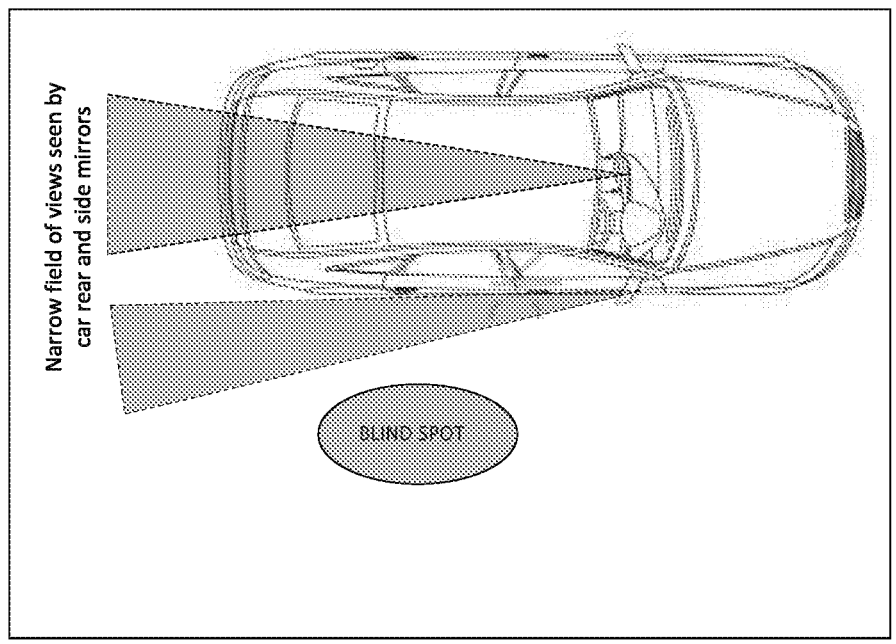
FIG. 9 (a) is a schematic drawing illustrating blind spots in vehicle driver's rear & side view due to the limited angular cone of viewing provided by rear and side view mirrors.
Figure 9:
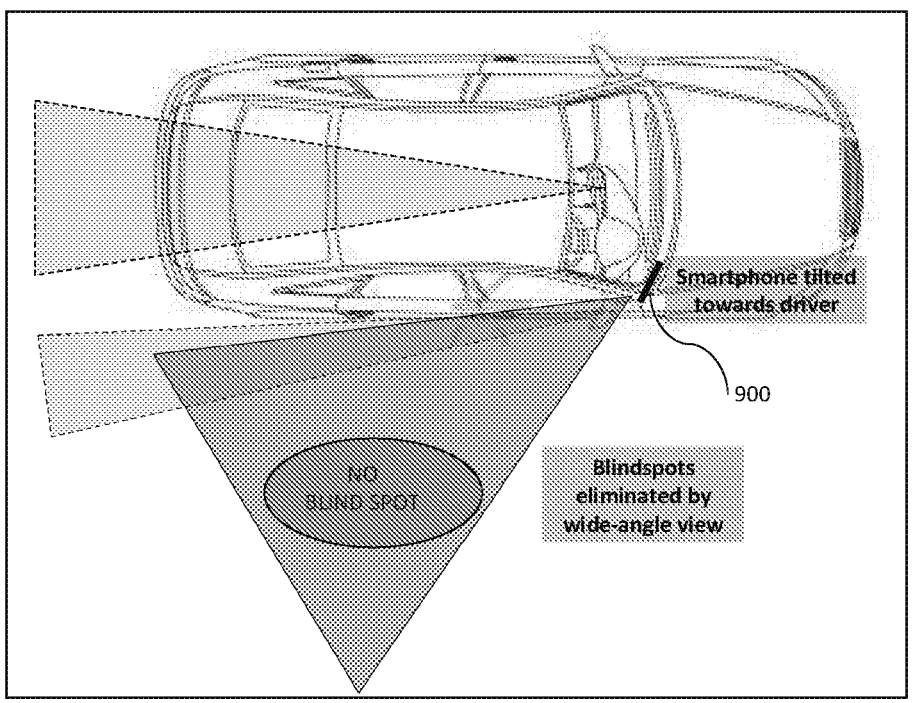

Application for Wide-Angle Viewing for Vehicle Driver According to Example Embodiments Many road accidents are caused by blind spots in vehicle driver's rear & side view due to the limited angular cone of viewing provided by rear and side view mirrors, see FIG. 9 (a). Blind spots can advantageously be eliminated using embodiments of the present invention providing real-time viewing of a wide-angle field of view for vehicle drivers, FIG. 9 (b). The smartphone 900 incorporating an optical deflection device according to example embodiments is mounted close to the driver's side window and angled towards the driver so that they directly see the viewing screen of the smartphone 900 front-on. In this orientation, the optical deflection device according to example embodiments can be used in the mode similar to the one shown in FIG. 8 (c) to provide a wide-angle field of view looking through the driver side window. One may also use embodiments of the present invention for eliminating blind spots on the passenger side of the car by locating the (or another) smartphone to the opposite side window.

The above described Embodiments of the present invention can have one or more of the following features and associated advantages:

| Feature: | Advantage: |
|---|---|
| Primarily for use in conjunction with front-mounted smartphone camera | Small lens aperture of front-mounted camera compared to rear-facing camera allows very small reflective optics to be used. Furthermore, when used with the front-mounted camera there is no image inversion whereas there is for rear-mounted camera. |
| Feature: | Advantage: |
| Very small reflective optics | Device has very thin profile of less than 4 mm (2 mm is possible) and so very low visibility, meaning it is almost undetectable and does not interfere with normal operation of all other smartphone functions |
| Feature: | Advantage: |
| Because the device can be used in conjunction with smartphone front-mounted camera it opens up new applications to the use of smartphone cameras. | For example, the device allows real-time viewing and use in a variety of other applications, such as providing a wide-angle field of view for vehicle drivers, eliminating blind spots. |
| Feature: | Advantage: |
| Can also be used in conjunction with the larger rear-mounted camera | Device geometry can be tailored to meet specifications of rear-mounted camera. Provides superior product to any currently available. |
| Feature: | Advantage: |
| Optical deflection is based on equilateral prism (and variations on this geometry such as an isosceles prism, see below), rather than right-angle prism or right-angle mirror as the optical deflecting element. | A prism that deflects a central ray by 60° (in the case of a equilateral prism) so that the maximum deflection of a light cone with half-angle of 30° is equal to 90°, i.e. allows sideways viewing parallel to the smartphone front surface. |

| Feature: | In comparison a right-angle prism deflects a central ray by 90° so the maximum deflection of a light cone with half-angle of 30° is much greater than 90°. This means that one has to make the prism large and displaced from the smartphone body, or one has to lose half the image and suffer image degradation from surface reflections. |
|---|---|
| Feature: Can customize the prism profile, e.g. an isosceles prism rather than an equilateral one to tune the deflection angle in the range of 50° to 75°. | Advantage: Deflection angle for central ray can be customized to be larger or smaller than 60°, depending on the application and mounted direction. This also allows optimization of the light transmitted to a given optical aperture size |
| Feature: Applicable to any model of smartphone | Advantage: Large market potential |
| Feature: Can be attached to any electronic device using miniature camera | Advantage: Opens up many other fields of applications for this technology, such as a laptop, security camera, spy camera, drone cameras |

The above described embodiments of the present invention may be specifically applicable to four target groups, though the scope of the application of the present invention is not limited in that regard.

A first group can be parents with young children. Everyone with young children knows that most of them do not like being photographed and change their behavior when they know they are being recorded. Any child can spot someone pointing a phone at them. This invention makes it almost impossible to realize that they are being recorded as the deflecting optics are very small and the camera is not pointed at them. All a user has to do is to hold the phone flat (parallel to the ground) in order to record in the forward-viewing or side-viewing mode, or hold it vertically (perpendicular to the ground) in order to record in a side-viewing mode (see also FIGS. 8 (a) to (d)).

A second group can be anyone who wishes to take covert photos and videos with a smartphone. The number of (low quality) devices available for this attests to the market for this.

A third group can be vehicle drivers who can use embodiments of the present invention to eliminate blind spots which exist when using the rear and wide mirrors. Vehicle mirrors are usually flat, and so present a limited field of view to the vehicle driver. This causes blind spots to either side of the vehicle. This can be solved by this invention using the front-mounted smartphone camera in conjunction with a deflection of a central ray as described in this write-up. When the smartphone is correctly located on the dashboard this allows the smartphone screen to show a wide angle field of view (up to 60 degrees) outside the car window, thus eliminating blind spots.

A fourth group can be those individuals with medical conditions so that they have a limited use of one or both hands. Here the ability to lay a smartphone on a flat surface and record without needing to use hands to hold the smartphone, and just control the recording with just one finger can be a significant help.

Embodiments of the present invention can have applications for use by existing manufacturers of smartphone accessories, including protective cases which may incorporate the miniature optical prism according to example embodiments. Example embodiments of the present invention can also have applications for use by camera and lens manufacturers who supply miniature lenses and optics for smartphones, and can supply the miniature optical prism according to example embodiments.

It is noted that while the above described embodiments are specifically aimed at deflecting light into a smartphone camera, the present invention is applicable to any other recording device which incorporates a miniature camera, such as a laptop, security camera, spy camera, drone camera, etc.

Different embodiments of the present invention described hereinafter build on the above described embodiments by combining together images from a number of miniature cameras which are closely positioned together but have different viewing directions, to give a composite image comprising a wide-angle field of view. In one simple embodiment two or three cameras grouped together in a row are used, as illustrated in FIG. 10.

Figure 10:
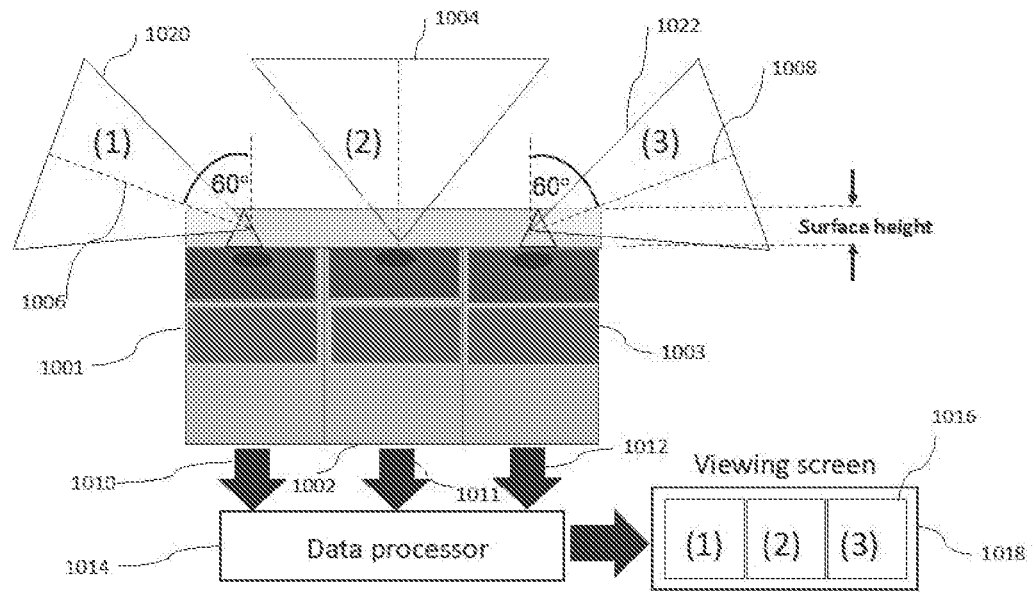
FIG. 10 is a schematic drawing illustrating generation of a composite image comprising a wide-angle field of view using two or three cameras grouped together in a row, according to an example embodiment.

In the case of a row of three cameras 1001-1003, FIG. 10, the central view 1004 is unaltered whereas the outer cameras 1001, 1002 have their viewing direction 1006, 1008 altered in the same viewing plane but in opposite directions. The change in viewing angle of the outer two cameras 1001, 1002 is similar to the field of view 1004 of the central camera so that their viewing angular cones preferably span a contiguous angular region. The three cameras 1001-1003 simultaneously collect images so that there are three streams 1010-1012 of data collected by a central processor 1014 which then combines the data from all three streams 1010-1012 to form a single, wide-angle composite image 1016 on a viewing screen 1018.

It is advantageous to have the viewing angles 1006, 1008 altered by an amount which is slightly less than the cameras' FOV in that direction, so as to provide a small overlap of a few degrees in the views 1020, 1004, 1022 provided by the angularly adjacent cameras 1001-1003. This overlap may be used by image stitching software to join individual images together into a larger composite image, as will be appreciated by a person skilled in the art.

Figure 11:
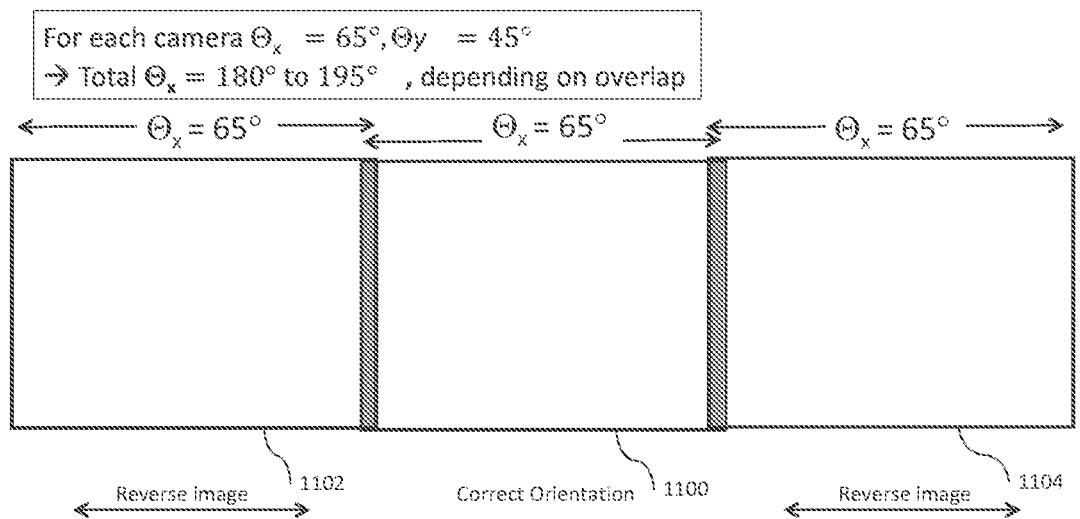
FIG. 11 is a schematic drawing illustrating generating a composite image using multiple cameras where each camera has a field of view in the horizontal direction of $\Theta_x=65°$, resulting in a composite field of view in that direction of 195°, according to an example embodiment.

If, for example, each camera 1001-1003 has a FOV in the horizontal direction of $\Theta_x=65°$ then the maximum composite FOV in that direction is the linear sum of the total, i.e. 195°, as illustrated in FIG. 11. As described above, in embodiments of the present invention the deflecting optics are based on a single reflection from a reflective surface. It is understood that this leads to image inversion in the plane of deflection whereas the unbent plane appears as normal. Accordingly, and as shown in FIG. 11, while the central view 1100 is captured in the correct orientation, the images captured from the deflected views 1102, 1104 are being processed according to example embodiments to reverse their orientation in the plane of deflection, in generating the composite image. As mentioned above, there can be a small angular overlap between the viewing angular cones of adjacent cameras, which is useful for alignment and other data processing options, so a more realistic or practical maximum in this particular case is 180°, according to an example embodiment.

Because the cameras that can be used in example embodiments are so small, they can be grouped together very tightly into a compact area. If each camera has a footprint of 4×4 mm in an example embodiment, then the total footprint area of three cameras thus combined is 12×4 mm. This is very small, allowing them to be located in small areas with minimal parallax errors, according to example embodiments.

The surface profile is advantageously also very small, according to example embodiments. Specifically, this is the height that the viewing device protrudes beyond the surface to which it is attached. In example embodiments, this height is determined by the height of the prisms, since only this portion of the device needs to protrude beyond the attachment surface. This makes embodiments of the present invention compatible with, for example, existing vehicles, they are not unsightly and have little chance of being damaged or causing any damage.

Furthermore, in the case of smartphones, there is currently no way that they can be used to generate wide angle fields of view in video mode or at one single time in still imaging mode. With embodiments of the present invention this becomes possible when more than one camera is used simultaneously. Hence, for the front camera, 'selfies' can be recorded over very wide angles according to example embodiments. For the rear camera, wide angle panoramas can be recorded at one time according to example embodiments, rather than the user having to rotate the camera body in a 'panorama' mode. Embodiments of the present invention therefore advantageously extend the viewing angle of smartphones from a single camera horizontal field of view of ~70° to ~140° if two cameras are used in an example embodiment, and ~180° if three cameras are used in an example embodiment.

Figure 12:
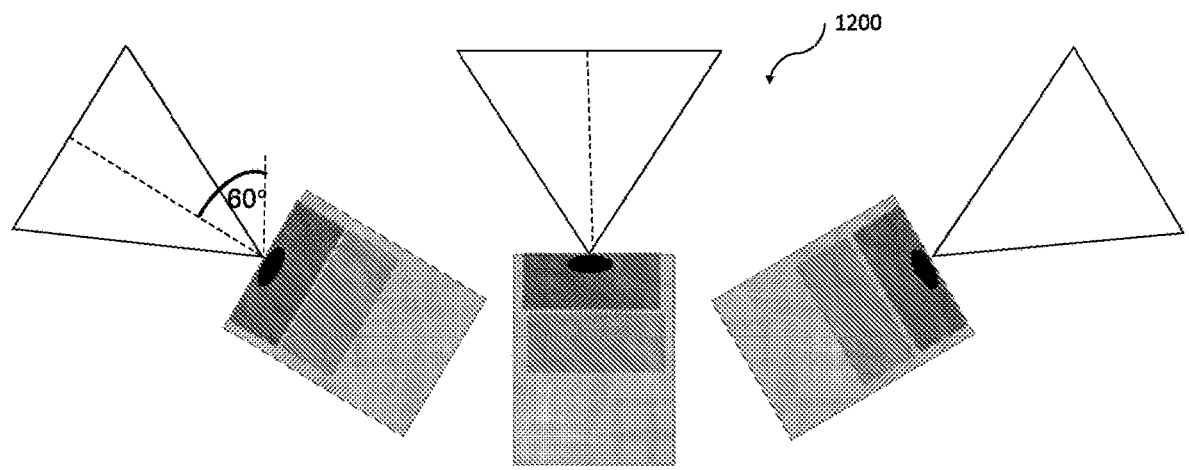
FIG. 12 is a schematic drawing illustrating use of a conventional arrangement of multiple cameras for wide-angle field of view which requires to project the cameras large distances beyond the attaching surface, which rules out its use in many applications where a low surface profile is essential.

Because of the manner in which the viewing angles are changed, the overall footprint area volume of the group of cameras according to a example embodiments is much smaller than one could manage simply by tilting the axis of each camera 1201-1203 body to the required viewing angle, and furthermore, critical to many applications, the surface height of such a conventional device 1200 illustrated in FIG. 12 would be such that it would need to project a large distances beyond the attaching surface (not shown), which rules out its use in many applications where a low surface profile is essential.

Furthermore, the identically flat orientation of each camera 1001-1003 in the array in FIG. 10 lends itself to cheaper manufacturing and simpler connections, compared to that shown in FIG. 12.

As described in the embodiments above with reference to FIGS. 1 to 9, the use of prisms allows one to change the viewing direction of a miniature camera, which may be located in a smartphone, or may be a stand-alone device, so that one may view parallel to the device surface. Where the camera 1300 is located away from the device edge 1302, as illustrated in FIG. 13 (a), this edge 1302 determines the maximum angle away from the camera axis 1304 which one may view; larger viewing angles are limited by the device body 1306 impeding light from reaching the prism 1308.

Figure 13:
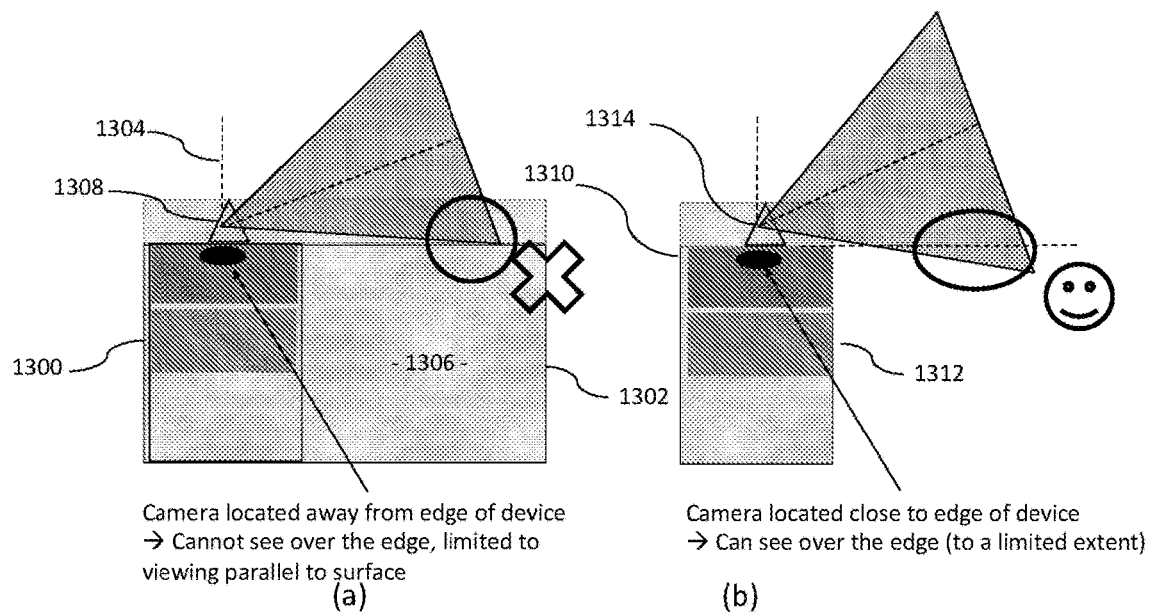
FIG. 13 (a) is a schematic drawing illustrating possible limitations on larger viewing angles, according to an example embodiment.

However, where the camera 1310 is located very close (for example only a few millimetres) to the device edge 1312, as illustrated in FIG. 13 (b), then some light from larger viewing angles greater than 90° can enter the small prism 1314 since the device body does not block it. While the amount of light entering the prism 1314 from such large viewing angles may be less than that for viewing angles of less than 90° it is sufficient to provide an image according to example embodiments, albeit one that may be of lower quality. This feature of an example embodiment is for example relevant to modern smartphones since many of them now incorporate front-viewing cameras which are located extremely close to the device edge, opening the way to such viewing over the edge according to example embodiments.

Furthermore, this feature is preferably sufficient to allow an increase in the viewing angle beyond a maximum of 180° in a composite device according to an example embodiment comprising e.g. three cameras, as described in more detail below for large-angle composite displays for applications at the front and rear of cars, and to provide sufficient angular overlap to stitch together overlapping images from a smartphone front-viewing and rear-viewing camera according to an example embodiment described in more detail below, and to provide angular overlap for constructing a VR camera device comprising very large angles in two orthogonal viewing planes, according to an example embodiment described in more detail below.

Figure 14:
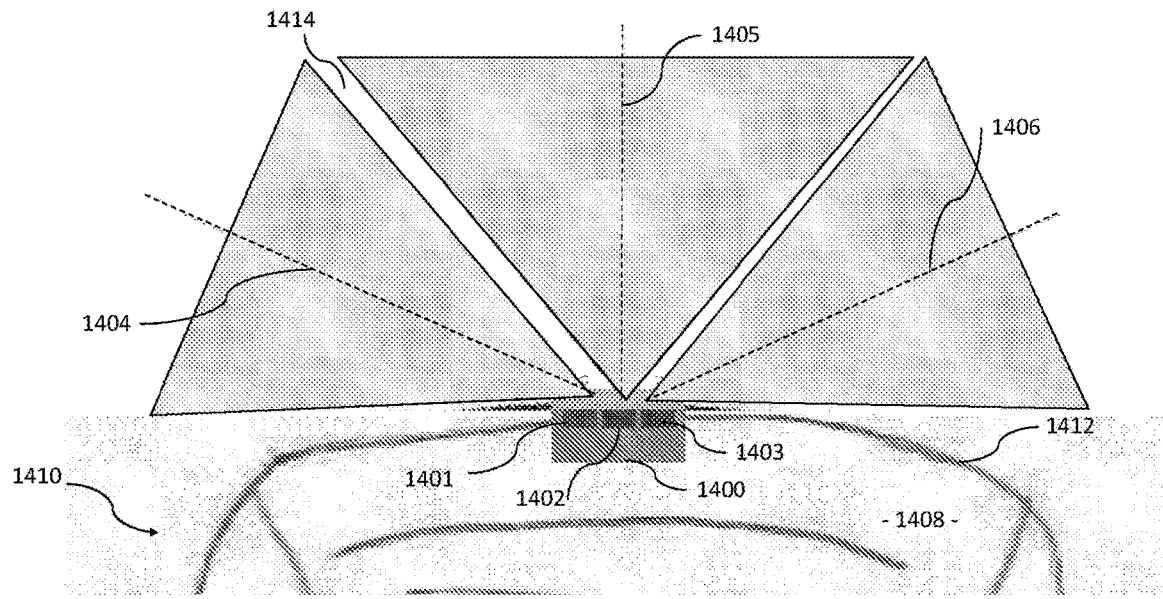
FIG. 14 is a schematic drawing illustrating small gaps between the viewing fields of adjacent cameras having negligible effect due to the very small distance between adjacent cameras and the angular overlap in the fields of view between adjacent cameras, according to an example embodiment.

Car Rear-/Front-Viewing Over Wide Angles of 180° or More According to Example Embodiments FIG. 14 shows how a device 1400 according to an example embodiment, similar to that in FIG. 10, comprising three miniature cameras 1401-1303 in the row, with their viewing directions 1404-1306 altered and overlapping to provide a composite image with a total angular range in the horizontal direction to be approximately or equal to 180°, or greater than 180°, depending on the FOV of each camera 1401-1303 and the change in viewing angle of the outer two cameras 1401, 1403. In this embodiment the device 1400 is placed at the very rear (or front) 1408 of the car 1410. Advantages of this device 1400 in this type of application include its low volume and small height required to protrude beyond the existing car 1410 surface 1412 to which it is affixed, compare also the description above with reference to FIGS. 10 to 12. The height is preferably only a few millimetres, determined by the geometry and heights of the prisms used to alter the viewing angle of the outer two cameras 1401, 1403, indicated as a rectangular circumference of the device 1400 extending beyond the surface 1412 in FIG. 14 for ease of illustration.

It is noted that while FIG. 14 schematically shows small gaps e.g. 1414 between the viewing fields 1404-1306 of adjacent cameras, in practice these gaps e.g. 1414 have negligible effect due to the very small actual distance between adjacent cameras 1401-1303 and/or the angular overlap in the fields of view achievable between adjacent cameras 1401-1403, compare also the description above with reference to FIG. 11.

Figure 15:
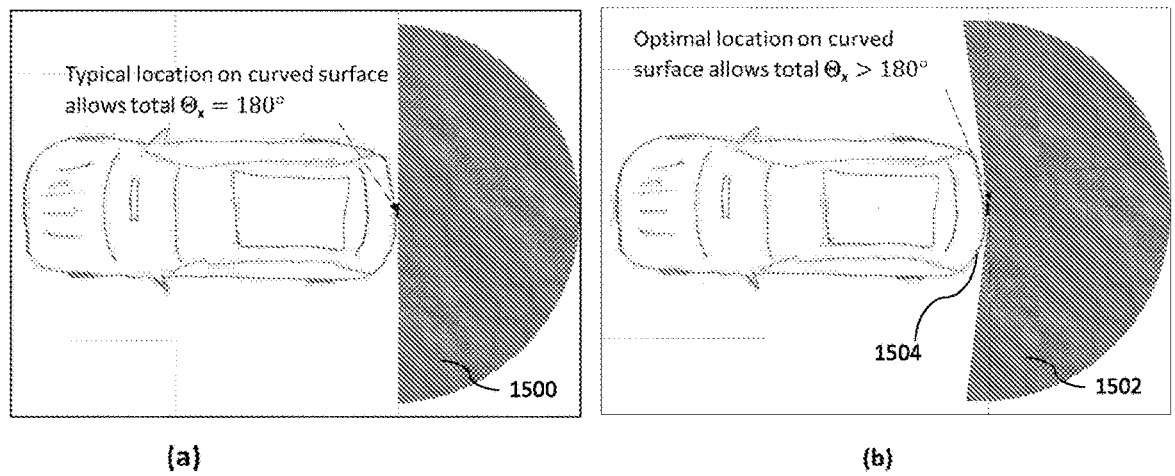
FIG. 15 (a) is a schematic drawing illustrating a wide viewing angle of 180° produced by a straight alignment and orientation of a device according to an example embodiment.

In FIG. 15 (a) the wide viewing angle 1500 of 180° produced by an alignment and orientation of the device of FIG. 14 is shown, whereas in FIG. 15 (b) an increased viewing angle 1502 with an angular range of about 190° to 200° is shown for a device according to another example embodiment in which the entrance planes of the adjacent cameras are not in the same plane, possible for example where the rear (or front) car surface 1504 is curved, as are most car rear (or front) spoilers.

FIG. 16 (a) shows three views 1601-1603 of a road behind a parked car, with the respective cameras located at the car rear surface at the centre of the spoiler. A vehicle 1604 approaching can be seen in the right-hand image 1603. It is an inevitable consequence imposed by the laws of perspective of three adjacent angular views, that while the central view appears "normal", in the two side views 1601, 1603 the same road appears oriented at a different angle, giving abrupt changes at the boundaries between the images 1601-1603. However, as will be appreciated by a person skilled in the art, there are image stitching software packages available that take such changes in perspective into account, and FIG. 16 (*b*) shows the composite image 1606 with smooth boundaries between the stitched fields and no large changes in angle of the road, according to an example embodiment.

Figure 17B:
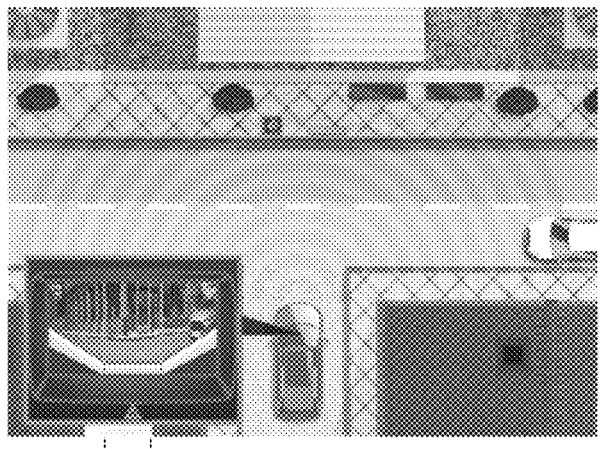
FIG. 17 (a) is an example of a wide-angle composite image using an existing wide-angle viewing system.

A comparison of the image quality and viewing angular range of the wide-angle composite image 1606 provided in FIG. 16 (*b*) with the image from Ford's wide-angle viewing system shown in FIG. 17, illustrates the superior quality and angular range afforded by an embodiment of the present invention, advantageously allowing for much more detail at wide angles to the discerned, with lower distortion.

Figure 18A:
FIG. 18 (a) shows a standard fisheye lens view image where the field of view is about 100° in the horizontal plane and 80° in the vertical plane.
Figure 18B:
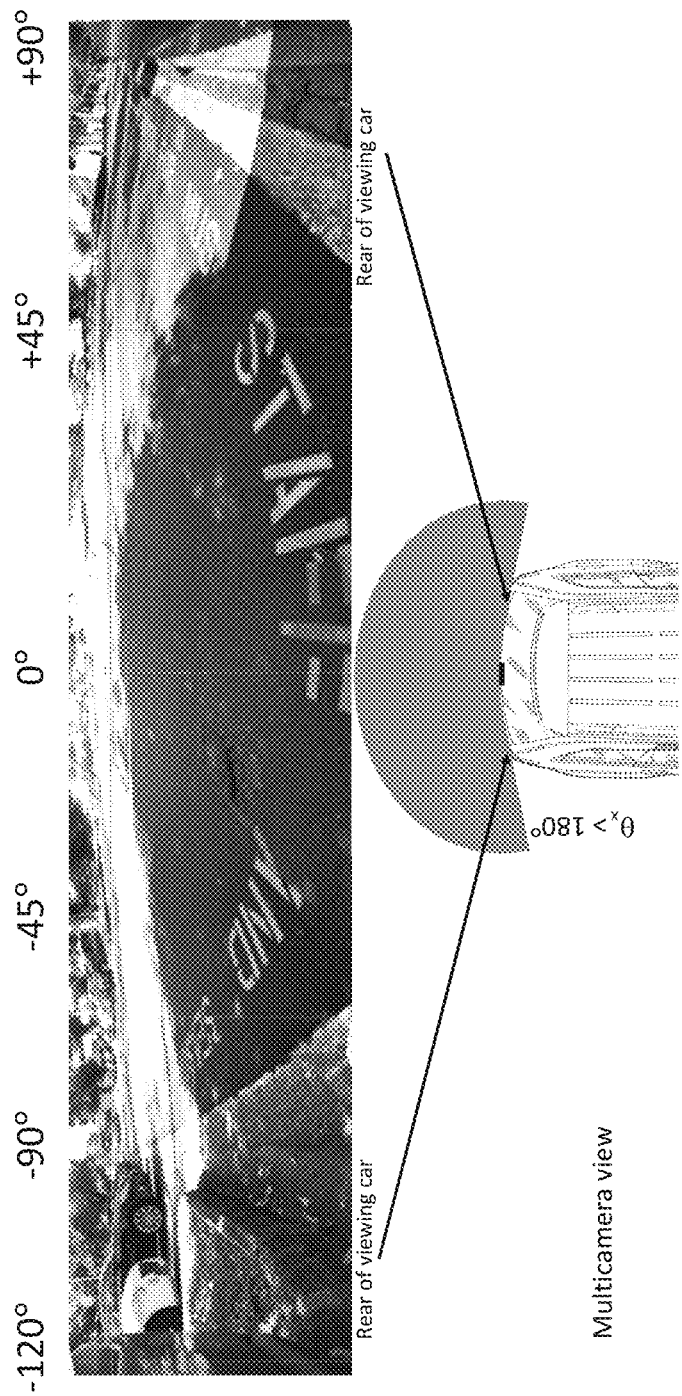

FIG. 18 (*b*) shows an even larger composite view that may be achieved with a viewing system using six cameras according to another embodiment. To simulate such an embodiment, six images were recorded sequentially from the rear of a car and stitched together to provide a viewing angle of significantly greater than 180° (compare also the description above with reference to FIG. 15 (*b*)). Also shown in FIG. 18 (*a*) for comparison is a standard fisheye lens view where the field of view is about 100° in the horizontal plane and 80° in the vertical plane.

Two (or More) Cameras on Same Surface Applied to Smartphone According to Example Embodiments Many modern smartphones have two front-viewing or rear-viewing cameras, with different focal lengths and fields of view. Consider, for example, the LG G6, see: http://www.lg.com/sg/mobile-phones/lg-G6. Typically one front-/rear-viewing camera has a standard FOV and the other camera has a wide angle FOV, allowing wider angles to be photographed, and more faces to be photographed in a wide-angle selfie.

One embodiment of the present invention as applied to smartphones is where more than one camera simultaneously collects images, with one camera recording an image in a standard orientation, i.e. perpendicular to the camera face. The second camera on the same face has a prism mounted in front of it to record an image from a different angular cone. These two images can then be combined (stitched) together in software to create a composite "selfie" or rear-view image which encompasses a much larger field of view than that achievable with a single image, even a wide-angle field of view camera image. Preferably, the various image reflections are taken into account in order to suitably combine them (see also the description above with reference to FIG. 11).

Figure 19:
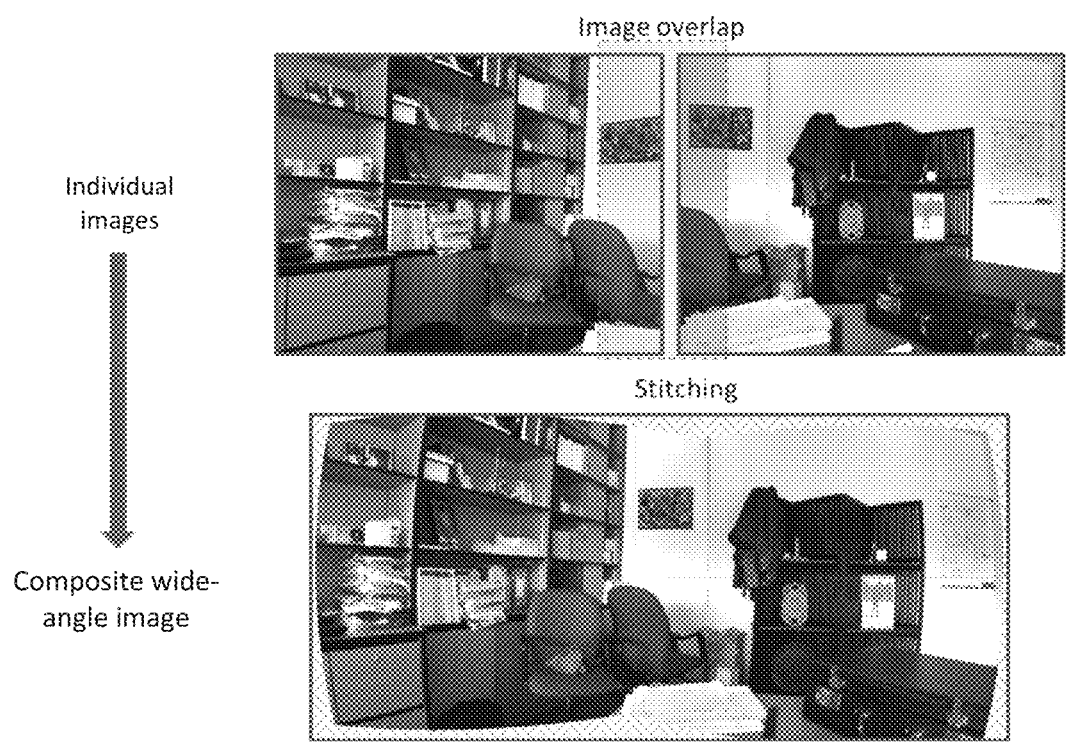
FIG. 19 shows the transition from individual images to a composite wide-angle image using stitching software for use in example embodiments, demonstrating the underlying principle of example embodiments applied to smartphones.
Figure 20:
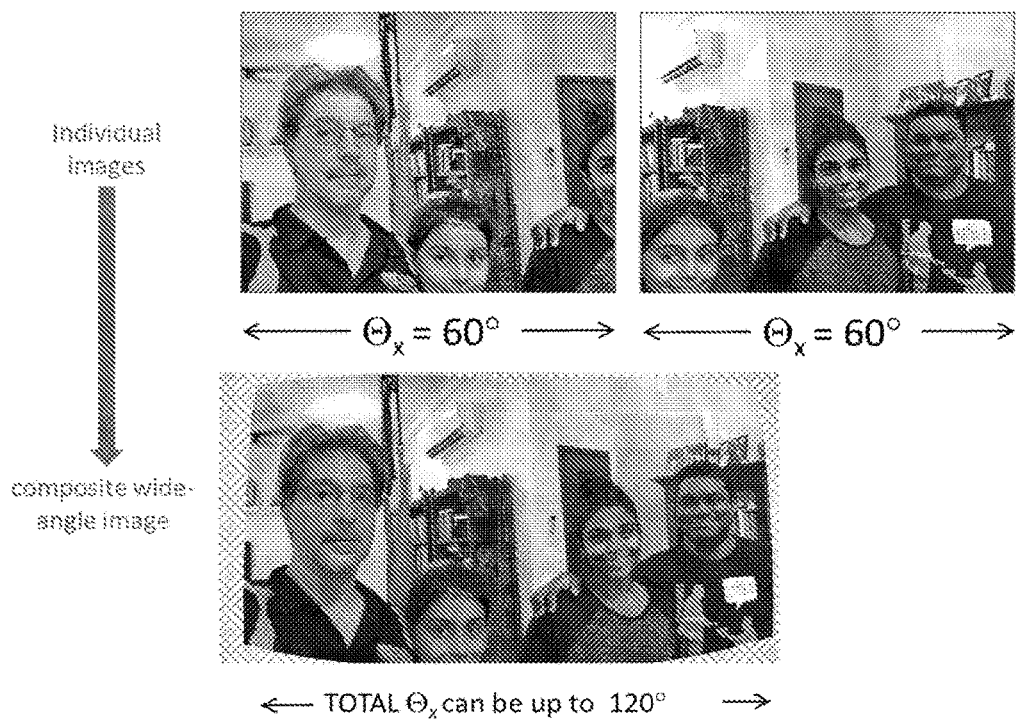
FIG. 20 shows the transition from individual images to a composite wide-angle image using stitching software for use in example embodiments, demonstrating the underlying principle of example embodiments applied to smartphones.

FIGS. 19 and 20 demonstrate the underlying principle of such example embodiments applied to smartphones In these cases, images were recorded using the same rear-viewing camera (FIG. 19) and front-viewing camera (FIG. 20) sequentially to simulate such embodiments, rather than simultaneously as would be the case in the actual example embodiments with multiple cameras, to demonstrate the principle. As described above with reference to FIGS. 10 to 18, if for example three cameras on a smartphone were arranged in a row, then composite images could be collected over viewing angles of up to, or greater than 180°, according to example embodiments.

Figure 21:
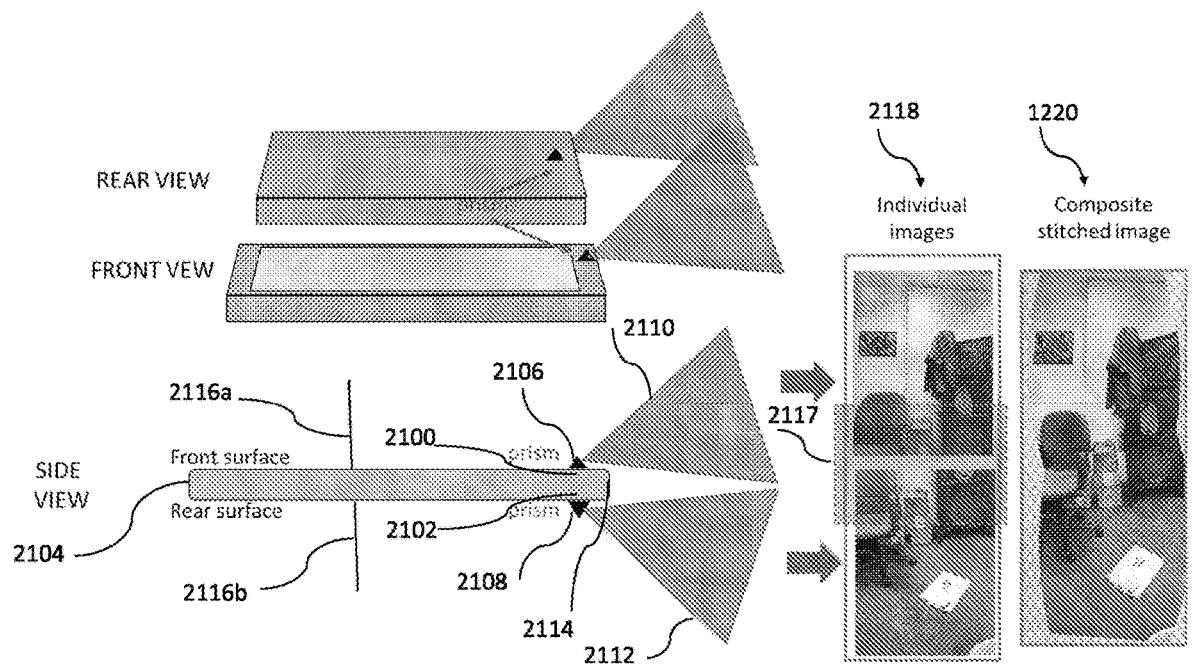
FIG. 21 is a schematic drawing including images, illustrating the effect of simultaneously collecting images from two smartphone cameras which are located on opposite surfaces, i.e. one front-viewing and one rear-viewing, of a smartphone and the use of stitching software, according to an example embodiment.

Two (or More) Cameras on Opposite Surfaces Applied to Smartphone According to Example Embodiments Extending from the above embodiments, other embodiments of the present invention exploit the effect of simultaneously collecting images from two smartphone cameras 2100, 2102 which are located on opposite surfaces, i.e. one front-viewing and one rear-viewing, of a smartphone 2104, as illustrated in FIG. 21. Each has a prism 2106, 2108 located in front of the camera 2100, 2102 so that the angular cones 2110, 2112 are deflected in the same viewing plane and in the same direction, and with a small angular overlap. Such embodiments make use of the fact that when the front or rear-viewing cameras 2100, 2102 are located close to the edge 2114 of the front or rear surface, it then becomes possible, at least to some extent, to see features which are more than 90° away from the surface-normal 2116*a*, 2116*b*, i.e. below the surface plane of the respective camera 2100, 2102 (compare also the description above with reference to FIG. 12 (*b*). This allows the angular overlap zone 2117 to be found parallel to the camera 2100, 2102 faces. The resulting images/views 2118 (individual images), 2120 (composite stitched image) of this combination are shown in FIG. 21 according to an example embodiment.

Multiple Camera Arrays to Form a VR Camera According to Example Embodiments

Figure 22:
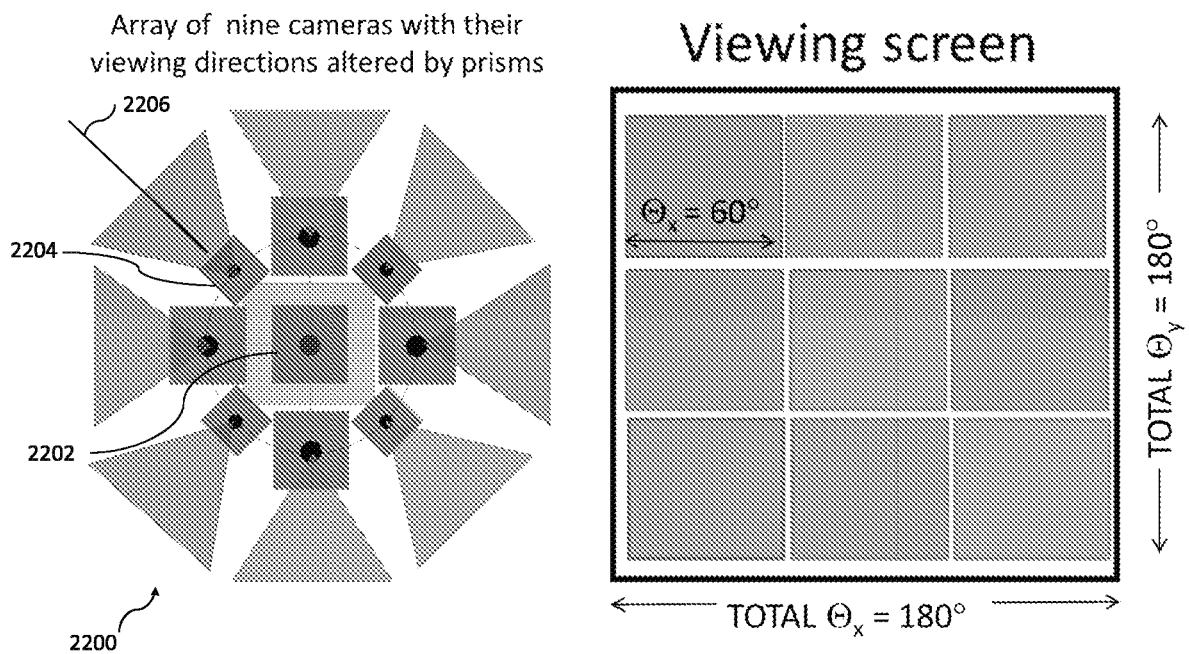
FIG. 22 is a schematic drawing illustrating a device comprising more than one miniature camera, here nine, for simultaneously collecting composite images over a wide angular range in two viewing planes, according to an example embodiment.

As described for the example embodiments above with reference to FIGS. 10 to 21, by operating more than one miniature camera according to example embodiments simultaneously, one can collect composite images over a wide angular range in one viewing plane. Extending such embodiments further to two viewing planes, for example a device 2200 comprising an array of miniature cameras e.g. 2202 as shown in FIG. 22 can be provided in another example embodiment. This may be based on a smartphone or it may be a stand-alone device.

In the example embodiment shown in FIG. 22, a total of 9 cameras e.g. 2202, 2204 are used, noting that the number may vary upwards or downwards in different embodiments. The central camera 2202 has a viewing direction which remains unaltered (pointing outward from the plane of FIG. 22, e.g. the plane of the mounting surface of the cameras), and the eight surrounding cameras e.g. 2204 each have a different viewing direction e.g. 2206, with a small amount of overlap between them. These eight cameras e.g. 2204 are located on an azimuthal ring, and each has an identical prism located on top of it in an orientation to alter the viewing direction around the azimuthal ring. According to this example embodiment, the output of the nine cameras e.g. 2202, 2204 which operate simultaneously with a suitable angular overlap between their fields of view are combined together using stitching software.

In this manner one may design a smartphone, or a stand-alone device, to give VR images and 360° images in a manner similar to existing dedicated VR units. For example, front and rear mounted sets of cameras on a smartphone (compare FIG. 21 for one such set) may be used, respectively arranged as illustrated with reference to FIG. 22. The advantages of embodiments of the present invention include that one may build a much flatter device occupying a much lower volume. A further advantage is that embodiments of the present invention provide a link for smartphones to access this growing market.

It is noted that in different embodiments, the device may comprise two or more sets of three or more cameras arranged on different azimuthal rings relative to the central camera 2202. Also, in different embodiments the device may further comprise at least a second central camera having a viewing direction different from the viewing direction of the first central camera 2202. Also, in different embodiments the device may comprise at least one other set of three or more cameras arranged on an azimuthal ring around the at least second central camera.

Figure 23:
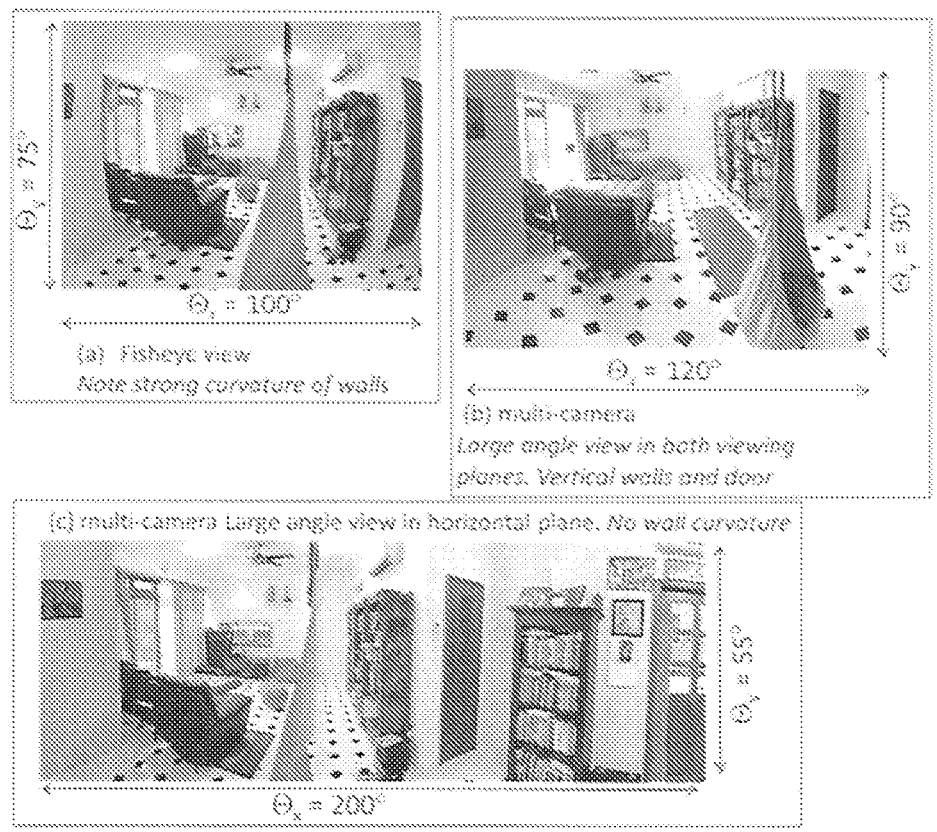
FIG. 23 (a) shows the vertical range from an existing fisheye view device.

FIG. 23 (*b*) shows how an embodiment based on the principles described above with reference to FIG. 21 may work in practice. For simulation purposes, an array of images from a smartphone are recorded sequentially and stitched together to form a composite image with large angular range in both viewing planes (vertical and horizontal). The vertical range is now significantly greater than that from a fisheye view shown in FIG. 23 (*a*) and also greater than the very wide angle view shown in FIG. 23 (*c*) according to an example embodiment based on a row of cameras (compare e.g. FIG. 10 described above), where again for simulation purposes, a series of images from a smartphone are recorded sequentially and stitched together to form a composite image.

In one embodiment a light deflection prism for mounting to a surface of a device is provided, the surface comprising a camera aperture region defining an actual light entrance angular cone projecting from the surface of the device, the light deflection prism comprising a first surface for disposing on the surface of the device so as to overlap the actual light entrance angular cone, which may also be referred to as the surface through which light exits the prism; a second surface, which may also be referred to as the surface through which light enters the prism; and a third surface for internal reflection of a central ray, entering the prism under a normal incidence angle through the second surface, towards the first surface under a normal angle of incidence; wherein the prism is configured such that the central ray enters the prism at an angle of less than 90° relative to a normal of the surface of the device and such that a ray at one boundary of an effective light entrance angular cone defined as a result of the light reflection at the third surface is substantially parallel to the surface of the device.

The prism may be configured such that the central ray enters the prism at an angle in the range of about or exactly 50° to 75° relative to a normal of the surface of the device.

The prism may be configured such that a half-angle of the effective light entrance angular cone is in the range of about or exactly 20° to 40°.

A height of the prism may be in the range of about or exactly 2 mm to 5 mm.

The prism may comprise an equilateral prism or an isosceles prism.

The prism may have an extended length of the first, second and third surfaces so as to increase the overlap with the actual light entrance angular cone.

In one embodiment, a device is provided comprising a surface comprising a camera aperture region of a first camera defining an actual light entrance angular cone projecting from the surface of the device; and a first light deflection prism of the before mentioned embodiment, attached to the surface of the device.

The device may comprise a smartphone, a laptop, a security camera, a spy camera, a drone camera, or any other recording device which incorporates a, typically miniature, camera.

The device may comprise a plurality of cameras including the first camera and one or more light deflection prisms including the first deflection prism, for providing a wide-angle viewing device in one or more viewing planes.

The device may comprise a processing unit for stitching processing of images and/or videos captured by the respective ones of the plurality of cameras.

The device may be configured such that individual viewing fields of adjacent ones of the plurality of cameras overlap to facilitate the stitching processing.

The plurality of cameras may be arranged such that two or more of the plurality of cameras have viewing directions that lie in substantially the same plane.

At least the first camera may be disposed near an edge of the device, and at least the first light deflection prism may be configured such that the field of view of at least the first camera extends beyond said edge.

A combined field of view of the plurality of cameras may be larger than 180° along one axis thereof.

The device may comprise first and second opposite surfaces, and the plurality of cameras include at least one camera disposed on each of the first and second surfaces. The device may be configured such that the viewing field of said at least one of the cameras on the first surface of the device overlaps with the viewing field of said at least one of the cameras on the second surface of the device.

The of cameras may be arranged such that three or more cameras are arranged along an azimuthal ring relative to a first central camera. The viewing fields of the three or more cameras may overlap with each other and/or the viewing field of the first central camera. The device may comprise comprise two or more sets of three or more cameras arranged on different azimuthal rings relative to the first central camera. The device may further comprise at least a second central camera having a viewing direction different from the viewing direction of the first central camera. The device may comprise at least one other set of three or more cameras arranged on an azimuthal ring around the at least second central camera.

The device may be configured for attachment to, or incorporation with, a smartphone, a laptop, a security camera, a spy camera, a drone camera, any other recording device which incorporates a, typically miniature, camera, a car, or a VR camera.

Figure 24:
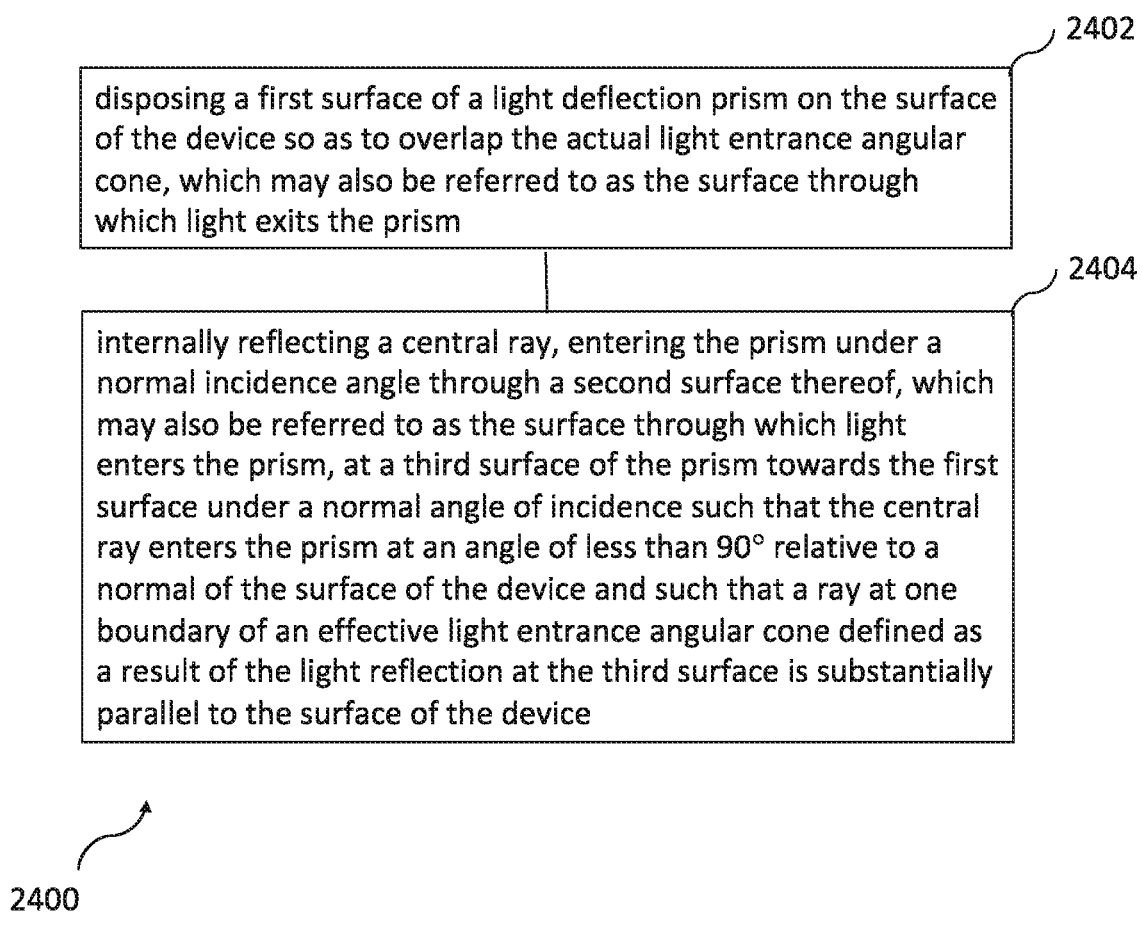
FIG. 24 is a flow chart illustrating a method of altering a field of view of a camera of a device comprising a surface with a camera aperture region defining an actual light entrance angular cone projecting from the surface of the device, according to an example embodiment.

FIG. 24 shows a flow chart 2400 illustrating a method for altering a field of view of a camera of a device comprising a surface with a camera aperture region defining an actual light entrance angular cone projecting from the surface of the device. At step 2402, a first surface of a light deflection prism is disposed on the surface of the device so as to overlap the actual light entrance angular cone, which may also be referred to as the surface through which light exits the prism. At step 2404, a central ray entering the prism under a normal incidence angle through a second surface thereof, which may also be referred to as the surface through which light enters the prism, is deflected at a third surface of the prism towards the first surface under a normal angle of incidence such that the central ray enters the prism at an angle of less than 90° relative to a normal of the surface of the device and such that a ray at one boundary of an effective light entrance angular cone defined as a result of the light reflection at the third surface is substantially parallel to the surface of the device.

The method may be applied for enabling side-ways viewing and/or wide-angle viewing.

The method may comprise combining an image of the field of view of the camera with one or more other images from different respective fields of views. The other one or more images may be captured using different cameras of the device.

Embodiments of the present invention described above with reference to FIGS. 10 to 23 can have one or more of the following features and associated advantages.

| Feature | Benefit/Advantage |
|---|---|
| Wide angle viewing produced by several miniature cameras, one or more of which with | Allows wide-angle images to be generated from a flat device_surface, since all cameras are |

| | |
|---|---|
| a viewing angle determined by a prism. A composite image is formed with low distortion. | in the same plane. Has low surface height and small volume, allowing it to be placed, for example, at rear surface of a car with minimal projection of about 5 mm. Compare VR and other multi-camera devices which typically have a large volume and surface height required so that cameras can point in different directions. |
| Array of three cameras, for example, can be used to form a field of view of 180°, providing far lower distortion compared to a fisheye lens or standard wide angle lens, and superior detail since image data from multiple camera sensors is combined. | Can be used to see over a 180° FOV at the rear and front of a car, for example, see Ford's split-view camera system which uses a wide-angle (probably a fisheye) lens to do this. |
| Allows smartphones to generate wide angle fields of view when more than one camera is used simultaneously. Hence, for the front camera, 'selfies' can be recorded over very wide angles. For the rear camera, wide angle panoramas can be recorded at one time, rather than the user having to rotate the camera body in a 'panorama' mode. | Extends viewing angle of smartphones from a single camera horizontal field of view of ~70° to ~140° if two cameras are used, and ~180° if three cameras are used. |
| Provides smartphones with an entry into the VR market and wide angle photography and videos | When used in conjunction with Apps for image processing and stitching this provides a whole new market opening and direction for smartphones. |

Example embodiments of the present invention seek to address limited field of view when using only a single camera, whether for smartphones or any imaging application such as laptops, security cameras, drone, where a wider field of view would be preferable in one or two viewing planes.

For example for smartphones, embodiments of the present invention provide for combining of images from different fields of views for still or video images without requiring addition of bulky optics. Embodiments of the present invention can give a highly original function to smartphones.

Application areas of example embodiments include wide-angle rear-/front car viewing displays, smartphones where more than one camera is used simultaneously to generate wide-angle views and the use of such devices as virtual reality (VR) cameras, other recording devices which incorporate miniature camera(s), such as a laptop, security camera, spy camera, drone camera, etc.

The various functions or processes disclosed herein, in particular the image processing functions or processes may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. A device comprising:
   a device body having front and rear surfaces facing away from each other, wherein the front surface comprises a first camera having a first aperture region defining a first actual light entrance angular cone projecting from the front surface of the device, and the rear surface comprises a second camera having a second aperture region defining a second actual light entrance angular cone projecting from the rear surface of the device;
   a first light deflection prism comprising:
      a first surface disposed on the front surface of the device so as to overlap the first actual light entrance angular cone;
      a second surface; and
      a third surface for internal reflection of a first central ray, entering the first light deflection prism under a normal incidence angle through the second surface, towards the first surface under a normal angle of incidence for exiting the first light deflection prism;
      wherein the first light deflection prism is configured such that the first central ray enters the first light deflection prism at an angle of less than 90° relative to a normal of the front surface of the device and such that a ray at one boundary of a first effective light entrance angular cone defined as a result of the light reflection at the third surface of the first light deflection prism is substantially parallel to the front surface of the device; and
   a second light deflection prism comprising:
      a first surface disposed on the rear surface of the device so as to overlap the second actual light entrance angular cone;
      a second surface; and
      a third surface for internal reflection of a second central ray, entering the second light deflection prism under a normal incidence angle through the second surface, towards the first surface under a normal angle of incidence for exiting the second light deflection prism;
      wherein the second light deflection prism is configured such that the second central ray enters the second light deflection prism at an angle of less than 90° relative to a normal of the rear surface of the device and such that a ray at one boundary of a second effective light entrance angular cone defined as a result of the light reflection at the third surface of the second light deflection prism is substantially parallel to the rear surface of the device; and
      wherein the first and second effective light entrance angular cones are deflected in the same viewing plane and in the same direction relative to the first and second actual light entrance angular cones, respectively.

2. The device of claim 1, wherein the device comprises a smartphone.

3. The device of claim 1, comprising a processing unit for stitching processing of images and/or videos captured by the respective ones of the first and second cameras.

4. The device of claim 1, configured such that individual viewing fields of the first and second cameras overlap.

5. The device of claim 1, wherein the first and second cameras are arranged to have viewing directions that lie in substantially the same plane.

6. The device of claim 1, wherein at least the first camera is disposed near an edge of the device, and at least the first light deflection prism is configured such that the field of view of at least the first camera extends beyond said edge.

7. The device of claim 1, wherein a combined field of view of the first and second cameras is larger than 180° along one axis thereof.

8. The device of claim 1, wherein the first light deflection prism is configured such that the central ray enters the first light deflection prism at an angle in the range of about or exactly 50° to 75° relative to the normal of the front surface of the device, and the second light deflection prism is configured such that the central ray enters the second light deflection prism at an angle in the range of about or exactly 50° to 75° relative to the normal of the rear surface of the device.

9. The device of claim 1, wherein the first light deflection prism is configured such that a half-angle of the first effective light entrance angular cone is in the range of about or exactly 20° to 40°, and the second light deflection prism is configured such that a half-angle of the second effective light entrance angular cone is in the range of about or exactly 20° to 40°.

10. The device of claim 1, wherein a height of one or both of the first and second light deflection prisms is in the range of about or exactly 2 mm to 5 mm.

11. The device of claim 1, wherein one or both of the first and second light deflection prisms comprises an equilateral prism or an isosceles prism.

12. The device of claim 1, wherein one or both of the first and second light deflection prisms has an extended length of the first, second and third surfaces so as to increase the overlap with the actual light entrance angular cone.

* * * * *